(12) United States Patent
Takahashi et al.

(10) Patent No.: US 10,714,990 B2
(45) Date of Patent: Jul. 14, 2020

(54) ROTATING ELECTRICAL MACHINE AND ROBOT DEVICE

(71) Applicant: Kabushiki Kaisha Toshiba, Minato-ku (JP)

(72) Inventors: Hiroshi Takahashi, Yokohama (JP); Yasuhito Ueda, Yokohama (JP); Takahiro Kokubo, Kamakura (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 235 days.

(21) Appl. No.: 15/687,898

(22) Filed: Aug. 28, 2017

(65) Prior Publication Data
US 2018/0166933 A1    Jun. 14, 2018

(30) Foreign Application Priority Data
Dec. 13, 2016 (JP) .................. 2016-241573

(51) Int. Cl.
*H02K 1/14* (2006.01)
*H02K 5/02* (2006.01)
(Continued)

(52) U.S. Cl.
CPC .............. *H02K 1/145* (2013.01); *B25J 9/126* (2013.01); *H02K 1/12* (2013.01); *H02K 1/14* (2013.01); *H02K 1/18* (2013.01); *H02K 1/27* (2013.01); *H02K 3/28* (2013.01); *H02K 5/02* (2013.01); *H02K 5/04* (2013.01); *H02K 5/08* (2013.01); *H02K 5/24* (2013.01); *H02K 11/00* (2013.01); *H02K 16/00* (2013.01)

(58) Field of Classification Search
CPC ......... B25J 9/126; H02K 11/00; H02K 16/00; H02K 1/12; H02K 1/14; H02K 1/145; H02K 1/18; H02K 1/27; H02K 3/28; H02K 5/02; H02K 5/04; H02K 5/08; H02K 5/24
USPC ....................................................... 310/89, 91
See application file for complete search history.

(56) References Cited

U.S. PATENT DOCUMENTS

| 6,229,238 B1 | 5/2001 | Graef |
| 7,863,789 B2 | 1/2011 | Zepp et al. |
| | (Continued) | |

FOREIGN PATENT DOCUMENTS

| JP | 10-75551 A | 3/1998 |
| JP | 2004-524673 A | 8/2004 |
| | (Continued) | |

*Primary Examiner* — Shawki S Ismail
*Assistant Examiner* — Demetries A Gibson
(74) *Attorney, Agent, or Firm* — Oblon, McClelland, Maier & Neustadt, L.L.P.

(57) ABSTRACT

According to one embodiment, a rotating electrical machine includes a shaft, an annular winding, a stator, a rotor, and a core supporter. The annular winding extends in a rotation direction of the shaft. The stator core includes a plurality of stator magnetic poles. The plurality of stator magnetic poles are arranged along the winding. The rotor core includes a plurality of rotor magnetic poles. The plurality of rotor magnetic poles are configured to face the plurality of stator magnetic poles. The core supporter is configured to support at least one of the stator core and the rotor core. The core supporter includes a first insulating section. The first insulating section extends in an axial direction of the shaft. The first insulating section has a slit-shape.

13 Claims, 29 Drawing Sheets

(51) Int. Cl.
*B25J 9/12* (2006.01)
*H02K 5/24* (2006.01)
*H02K 3/28* (2006.01)
*H02K 1/12* (2006.01)
*H02K 16/00* (2006.01)
*H02K 1/27* (2006.01)
*H02K 5/04* (2006.01)
*H02K 1/18* (2006.01)
*H02K 5/08* (2006.01)
*H02K 11/00* (2016.01)

(56) References Cited

U.S. PATENT DOCUMENTS

| | | |
|---|---|---|
| 2004/0207281 A1 | 10/2004 | Detela |
| 2005/0062352 A1 | 3/2005 | Kastinger |
| 2008/0211326 A1 | 9/2008 | Kang et al. |
| 2014/0042851 A1* | 2/2014 | Takemoto ............ H02K 1/2713 310/114 |
| 2014/0101927 A1* | 4/2014 | Nadeau ................ H02K 1/2773 29/598 |
| 2014/0117793 A1* | 5/2014 | Takahashi ................ H02K 9/00 310/52 |
| 2015/0048708 A1* | 2/2015 | Nord ...................... H02K 1/145 310/156.56 |
| 2015/0349589 A1* | 12/2015 | Takahashi ............... H02K 1/145 310/257 |
| 2016/0276880 A1 | 9/2016 | Ueda et al. |
| 2016/0276881 A1 | 9/2016 | Takahashi et al. |
| 2017/0077792 A1 | 3/2017 | Ueda et al. |
| 2017/0267493 A1 | 9/2017 | Takahashi et al. |
| 2018/0062492 A1* | 3/2018 | Akanuma ............. H02K 35/02 |
| 2018/0278133 A1* | 9/2018 | Blevins ................. H02K 16/04 |

FOREIGN PATENT DOCUMENTS

| | | |
|---|---|---|
| JP | 2006-340496 | 12/2006 |
| JP | 4085059 | 4/2008 |
| JP | 2009-512418 | 3/2009 |
| JP | 2010-158140 A | 7/2010 |
| JP | 4743718 | 8/2011 |
| JP | 4773053 | 9/2011 |
| JP | 2015-228730 A | 12/2015 |
| JP | 2016-178786 | 10/2016 |
| JP | 2016-178820 | 10/2016 |
| JP | 2017-60299 | 3/2017 |
| JP | 2017-169343 A | 9/2017 |

* cited by examiner

ROTATING ELECTRICAL MACHINE AND ROBOT DEVICE

CROSS-REFERENCE TO RELATED APPLICATION

This application is based upon and claims the benefit of priority from Japanese Patent Application No. 2016-241573, filed Dec. 13, 2016; the entire contents of which are incorporated herein by reference.

FIELD

Embodiments described herein relate generally to a rotating electrical machine and a robot device.

BACKGROUND

An electromagnetic motor requires high performance for reasons such as energy saving, $CO_2$ reduction, or the like, and representative performance such as reduction in size and weight, high efficiency, high torque, high output, or the like, is remarkably improved every day. Electromagnetic motors can be generally classified according to a direction of magnetic flux into (1) radial flux motors, (2) axial flux motors, and (3) transversal flux motors. Among these, radial flux motors are particularly excellent in cost-performance, and widely used for various products in industrial fields as a representative mechanical element of a universal actuator. In addition, axial flux motors have a three-dimensional complex magnetic path configuration, and in particular, are applied in the field of medium/large-sized large-diameter thin motors.

On the other hand, transversal flux motors include a rotor having permanent magnets, and an armature having an annular coil and a stator core, for example. The annular coil is annularly formed about a rotary shaft. In addition, the stator core is constituted by, for example, a plurality of U-shaped cores (hereinafter referred to as U-shaped stator cores) surrounding the annular coil. According to the above-mentioned transversal flux motor, since multipolarization can be relatively easily realized, a large torque motor with a small size can be obtained. That is, in a radial flux motor or an axial flux motor, a dead space configured to allow insertion of coils into a plurality of slots is needed. On the other hand, in a transversal flux motor, for example, since the plurality of U-shaped stator cores may be arranged in a rotation direction of the rotary shaft, multipolarization is easily performed in general. In addition, the armature including the annular coil and the U-shaped stator cores has a structure in which a magnetic flux generated by the coil cannot easily leak to the outside. For this reason, generation efficiency of the magnetic field by the coil is increased, and in comparison with the radial flux motor or the axial flux motor having a coil end, reduction in size can be expected.

Incidentally, in rotating electrical machines, additional performance improvement is expected.

DETAILED DESCRIPTION

Figure 1A:
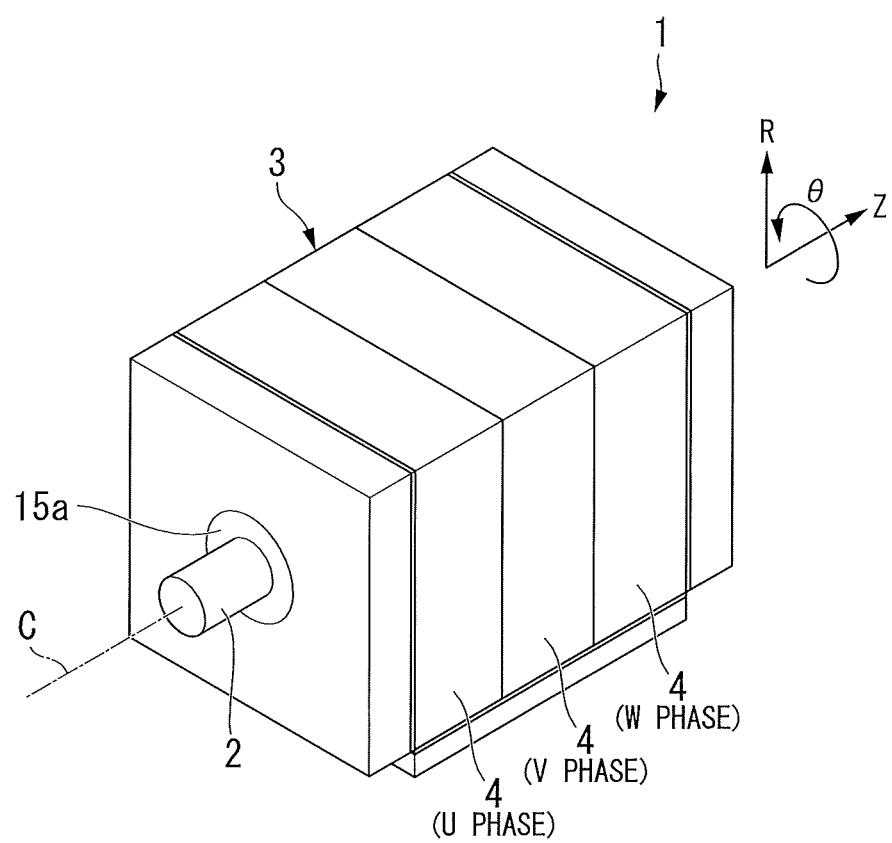
FIG. 1A is a perspective view showing a rotating electrical machine of a first embodiment as a whole.

According to one embodiment, a rotating electrical machine includes a shaft, an annular winding, a stator, a rotor, and a core supporter. The annular winding extends in a rotation direction of the shaft. The stator core includes a plurality of stator magnetic poles. The plurality of stator magnetic poles are arranged along the winding. The rotor core includes a plurality of rotor magnetic poles. The plurality of rotor magnetic poles are configured to face the plurality of stator magnetic poles. The core supporter is configured to support at least one of the stator core and the rotor core. The core supporter includes a first insulating section. The first insulating section extends in an axial direction of the shaft. The first insulating section has a slit-shape Hereinafter, a rotating electrical machine and a robot device of an embodiment will be described with reference to the accompanying drawings. Further, in the following description, configurations having the same or similar functions are designated by the same reference numerals. An overlapping description of such components may be omitted.

In addition, for the convenience of description, an axial direction Z, a radial direction R and a rotation direction θ with respect to a shaft 12 will be defined in advance. The axial direction Z of the shaft 12 is a direction substantially parallel to a rotary center axis (i.e., an axis) C of a rotating electrical machine 1. The radial direction R of the shaft 12 is a direction substantially perpendicular to the axial direction Z, and a direction radially away from the rotary center axis C and a direction opposite thereto (i.e., a direction toward the rotary center axis C). The rotation direction θ of the shaft 12 is a direction substantially perpendicular to the axial direction Z and the radial direction R, and a direction of rotation around the rotary center axis C while maintaining a certain distance from the rotary center axis C.

In addition, the term "insulation" mentioned in the application indicates electrical insulation.

First Embodiment

First, a rotating electrical machine 1 of a first embodiment will be described with reference to FIGS. 1A to 5.

Figure 1B:
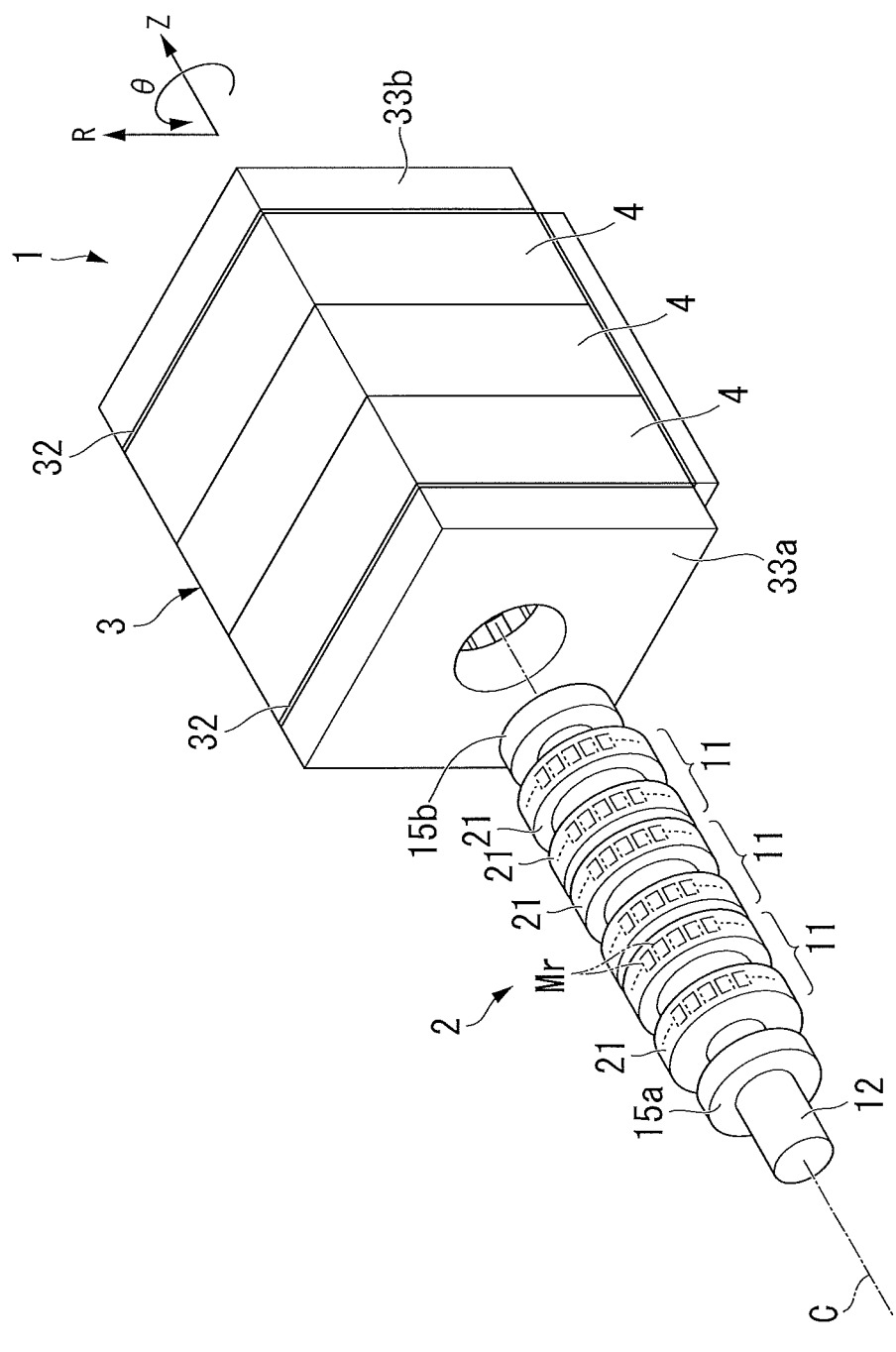
FIG. 1B is a partially exploded perspective view of the rotating electrical machine of the first embodiment.

FIG. 1A is a perspective view showing the rotating electrical machine 1 of the embodiment as a whole. FIG. 1B is a partially exploded perspective view showing the rotating electrical machine 1 shown in FIG. 1A. The rotating electrical machine 1 of the embodiment is a transversal flux motor (i.e., a transversal magnetic flux type motor) in which a magnetic path is formed in the axial direction Z of the shaft 12.

For example, as shown in FIG. 1B, the rotating electrical machine 1 of the embodiment includes a rotor 2 and a stator 3. The rotor 2 is formed in a columnar shape, and disposed along the rotary center axis C of the rotating electrical machine 1. The rotor 2 is rotatably supported by bearings 15a and 15b attached to the stator 3 and is rotatable in the rotation direction θ. The stator 3 surrounds the rotor 2 as a whole.

When seen from another viewpoint, the rotating electrical machine 1 includes, for example, a plurality of basic units 4 arranged in the axial direction Z. Each of the basic units 4 includes a rotor 11 included in the rotor 2, and an armature 31 (see FIG. 2B) included in the stator 3. In the embodiment, the rotating electrical machine 1 is a 3-stage (3-phase) rotating electrical machine, and includes three sets of basic units 4 (e.g., a U phase, a V phase and a W phase) arranged in the axial direction Z. Hereinafter, components of the rotating electrical machine 1 will be described one by one.

First, the rotor 2 will be described.

As shown in FIG. 1B, the rotor 2 includes the plurality of (for example, three) rotors 11 arranged in the axial direction Z, and the shaft 12 to which the plurality of rotors 11 are attached. The plurality of rotors 11 are disposed to correspond to the basic units 4 that are different from each other. The shaft 12 is formed in a columnar shape in the axial direction Z and inserted into the plurality of rotors 11. The shaft 12 is rotatably supported by the bearings 15a and 15b attached to the stator 3.

Each of the plurality of rotors 11 includes, for example, a rotor core 21 and a plurality of permanent magnets (not shown). The rotor core 21 is formed in an annular shape in the rotation direction θ (an annular shape about the rotary center axis C). The rotor core 21 is formed by, for example, a pressed powder core (a pressed powder magnetic core or a powder core). The pressed powder core is a core material through which current flows more hardly than, for example, in an electromagnetic steel plate (a lamination steel plate) or the like. The plurality of permanent magnets are installed on the rotor core 21. Accordingly, an outer circumferential surface of the rotor core 21 includes a plurality of (for example, 24) rotor magnetic poles Mr. The plurality of rotor magnetic poles Mr are arranged in the rotation direction θ. For example, the plurality of rotor magnetic poles Mr are disposed on the outer circumferential surface of the rotor core 21 such that N poles and S poles are alternately arranged in the rotation direction θ. The plurality of rotor magnetic poles Mr face a plurality of stator magnetic poles Ms (to be described below) of the armatures 31 in the radial direction R.

Next, the stator 3 will be described.

Figure 2A:
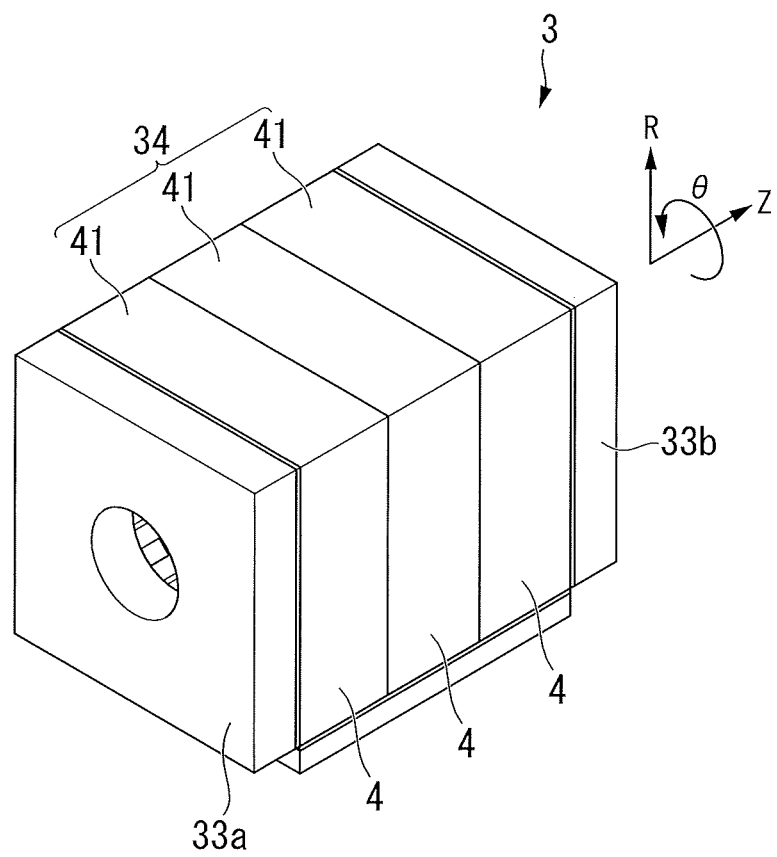
FIG. 2A is a perspective view showing a stator of the first embodiment.
Figure 2B:
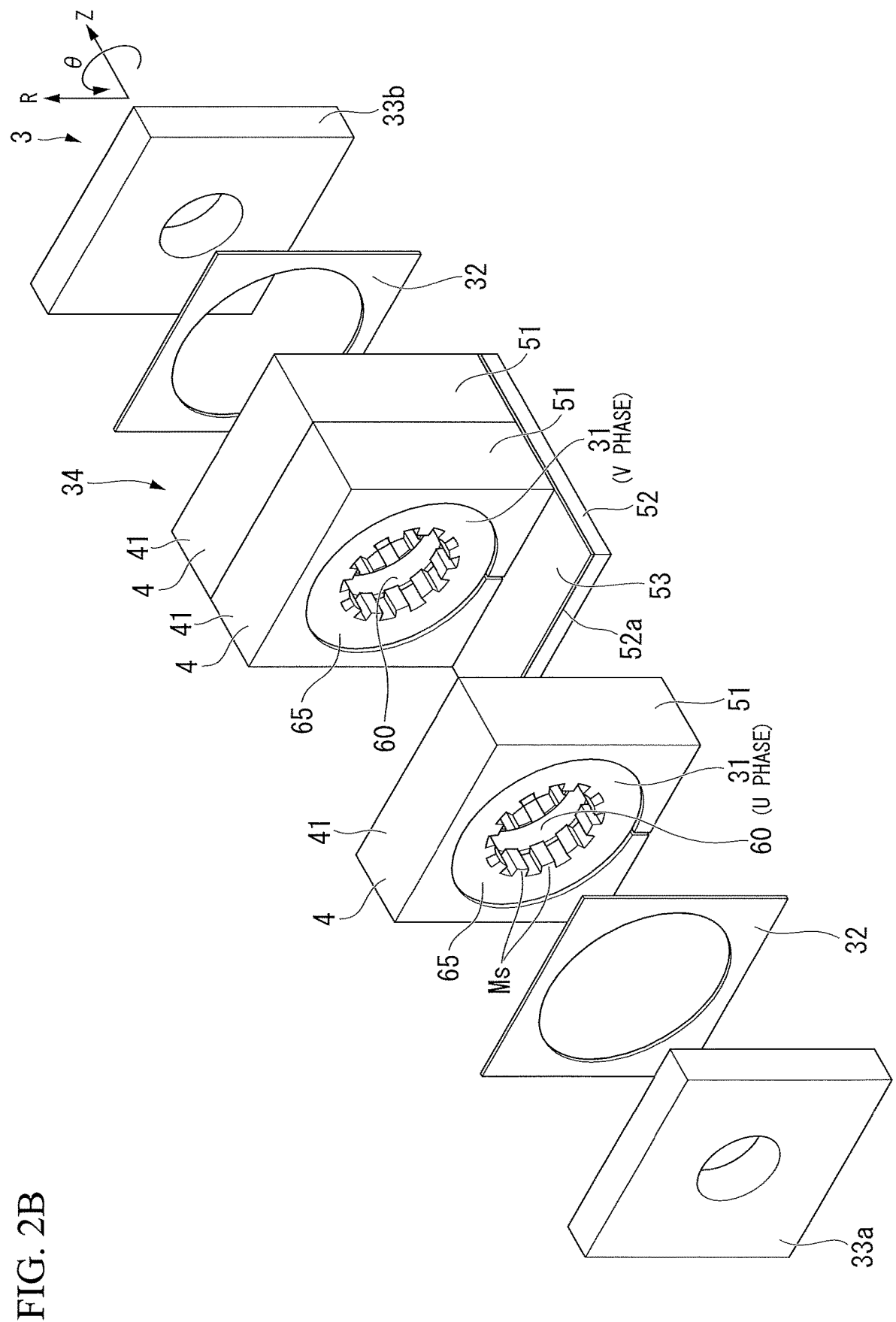
FIG. 2B is a partially exploded perspective view of the stator of the first embodiment.

FIG. 2A is a perspective view showing the stator 3 of the embodiment. FIG. 2B is a partially exploded perspective view showing the stator 3 shown in FIG. 2A.

For example, as shown in FIG. 2B, the stator 3 includes, for example, the plurality of (for example, three) armatures 31 arranged in the axial direction Z, a plurality of spacers 32, a pair of bearing holders 33a and 33b, and a support structure 34 configured to support, for example, the plurality of armatures 31.

The plurality of armatures 31 are disposed to correspond to the basic units 4 that are different from each other. The armatures 31 are disposed to oppose the rotors 11 of the rotor 2 with a predetermined gap therebetween in the radial direction R. The plurality of spacers 32 are disposed between, for example, the armatures 31 and the bearing holders 33a and 33b. Electrical insulation processing (oxidation processing, coating of an insulating material, or the like) is performed on surfaces of the spacers 32 in contact with at least the armatures 31. Further, instead of this, the spacers 32 may be formed of a material having an electrical insulation property. One bearing holder 33a is disposed at one end portion of the rotating electrical machine 1 to hold the bearing 15a. The other bearing holder 33b is disposed at the other end portion of the rotating electrical machine 1 to hold the bearing 15b.

The support structure 34 includes, for example, a plurality of core supporters 41. The plurality of core supporters 41 are disposed to correspond to the basic units 4 that are different from each other. Each of the core supporters 41 includes, for example, a casing 51, a base 52, an insulating sheet 53 and a plurality of fixing members 54 (see FIG. 4). Further, some or all of the casing 51, the base 52 and the insulating sheet 53 that are included in the plurality of core supporters 41 may be formed integrally with the plurality of core supporters 41. For example, in the embodiment, each of the base 52 and the insulating sheet 53 is formed integrally with the plurality of core supporters 41. Components of the support structure 34 will be described below in detail.

Next, parts included in the stator 3 will be described in detail.

Figure 3A:
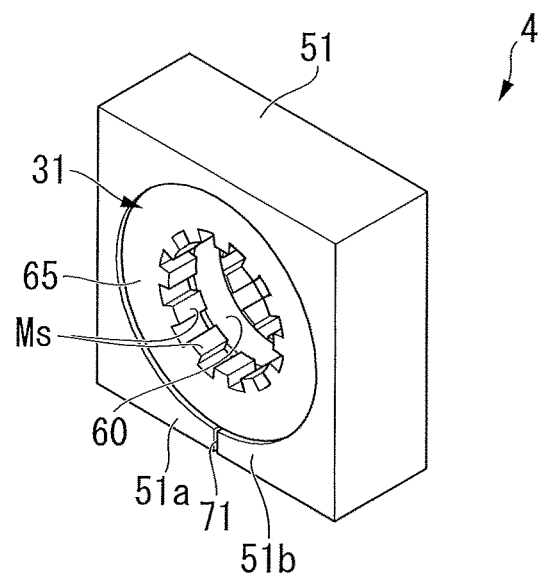
FIG. 3A is a perspective view showing stator parts included in one basic unit of the first embodiment.
Figure 3B:
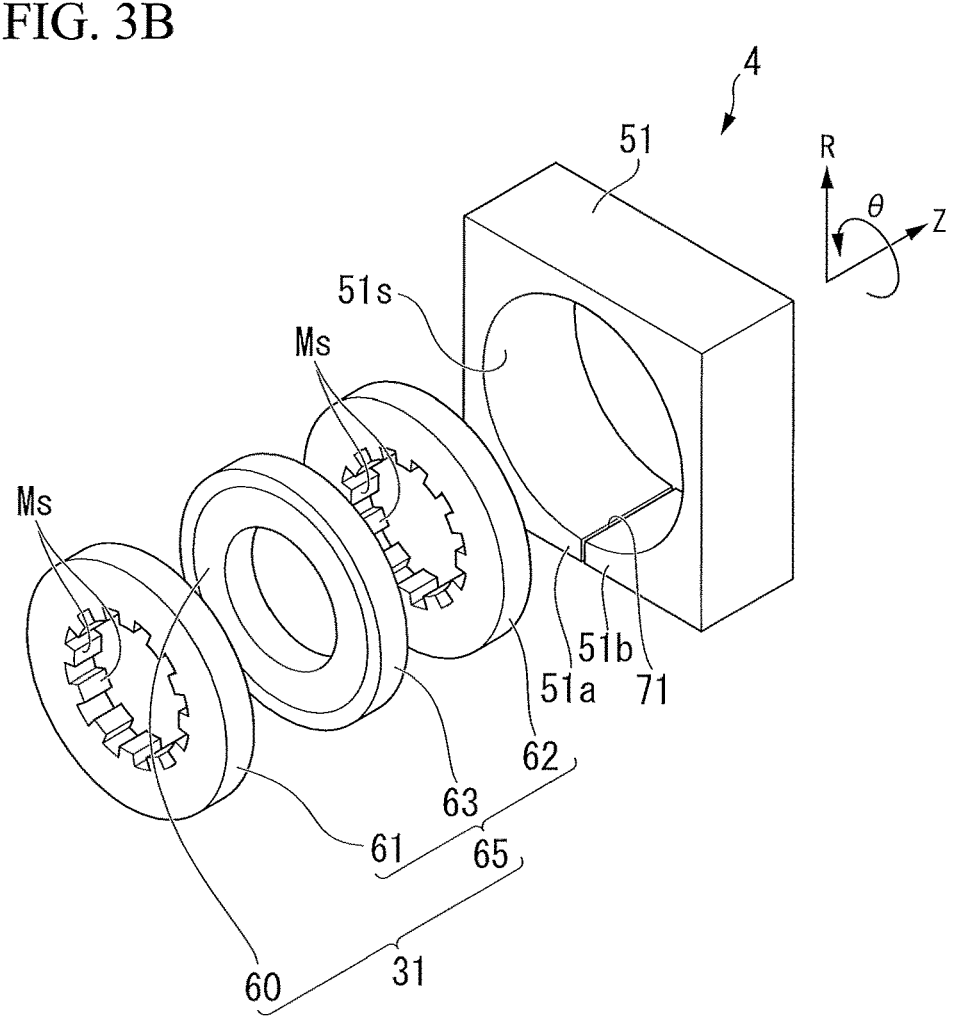
FIG. 3B is a partially exploded perspective view showing the stator parts included in the one basic unit of the first embodiment.

FIG. 3A is a perspective view showing stator parts included in one of the basic units 4 of the embodiment. FIG. 3B is a partially exploded perspective view showing the stator parts included in the one basic unit 4 shown in FIG. 3A. Further, configurations of the basic units 4 of a U phase, a V phase and a W phase are substantially the same as each other. For this reason, here, the basic unit 4 of the U phase will be representatively described.

As shown in FIG. 3B, the stator parts included in the one basic unit 4 include at least, for example, the armature 31 and the casing 51, for example. The armature 31 includes a winding 60, a first stator core 61, a second stator core 62 and a third stator core 63.

The winding 60 is a ring coil formed in an annular shape in the rotation direction θ (an annular shape about the rotary center axis C). One winding 60 is installed in each of the basic units 4. That is, the rotating electrical machine 1 of the embodiment includes a total of three windings 60. For example, currents having phases differing by 120 degrees are supplied to the three windings 60. Further, the phases of the currents supplied to the windings 60 are not limited to the above-mentioned example.

The first stator core 61 and the second stator core 62 are disposed separate from each other in the axial direction Z, and separately disposed at both sides of the winding 60 in the axial direction Z. For example, the first stator core 61 and the second stator core 62 sandwich the winding 60 from both sides. Each of the first stator core 61 and the second stator core 62 is formed in an annular shape in the rotation direction θ.

Each of the first stator core 61 and the second stator core 62 includes the plurality of (for example, 12) stator magnetic poles Ms on the inner circumferential surfaces of the first stator core 61 and the second stator core 62. Each of the stator magnetic poles Ms is formed by a protrusion protruding from the inner circumferential surface of the first stator core 61 or the second stator core 62 toward the inside in the radial direction R. The plurality of stator magnetic poles Ms are arranged along the winding 60 in the rotation direction θ. The plurality of stator magnetic poles Ms are excited as current is supplied to the windings 60.

The third stator core 63 includes the winding 60 installed therein. That is, the third stator core 63 is disposed on an outer circumferential side of the winding 60 and supports the winding 60 from the outer circumferential side. The third stator core 63 is formed in an annular shape in the rotation direction θ. The third stator core 63 is disposed between the first stator core 61 and the second stator core 62 and magnetically connects the first stator core 61 and the second stator core 62. Accordingly, for example, a magnetic path (a magnetic flux flow path) is formed in the armatures 31 from the first stator core 61 toward the second stator core 62 via the third stator core 63.

The first stator core 61, the second stator core 62 and the third stator core 63 form a stator core 65 since they are matched and integrated with each other. Each of the first stator core 61, the second stator core 62 and the third stator core 63 is formed by, for example, a pressed powder core (a pressed powder magnetic core or a powder core). Further, the configuration of the stator core 65 is not limited to the above-mentioned example. For example, the third stator core 63 may be a core member in which the magnetic path is formed by the first stator core 61 and the second stator core 62 being installed therein.

Next, the casing 51 of the core supporters 41 will be described.

As shown in FIG. 3B, the casing 51 is formed in a substantially annular shape along a external form of the stator core 65 (for example, around the external form), is fitted onto the stator core 65 and supports the stator core 65 from the outer circumferential side. The casing 51 of the embodiment has a cavity (an accommodating section) 51s corresponding to the external form of the stator core 65. The casing 51 supports and fixes the stator core 65 accommodated in the cavity 51s from the outer circumferential side. Further, "the substantially annular shape" disclosed herein broadly means a shape having a space in a central section. That is, "the substantially annular shape" disclosed herein is not limited to the case in which the external form or the shape of the inner circumferential surface is a circular shape and also includes the case in which the external form or the shape of the inner circumferential surface is a polygonal shape. For example, the casing 51 of the embodiment may have a external form with a rectangular shape. In addition, "support" disclosed herein is not limited to the case in which members are directly supported due to contact therebetween and includes the case in which they are indirectly supported with another member interposed therebetween. The casing 51 is formed of, for example, a non-magnetic material.

The casing 51 of the embodiment includes a slit-shaped insulating section 71 formed in the axial direction Z. The insulating section 71 is an example of "a first insulating section." The insulating section 71 passes through the casing 51 in the axial direction Z. For example, the insulating section 71 has a through-groove that passes through the casing 51 in the axial direction Z, and the through-groove is filled with an insulating material including air or a vacuum. The insulating section 71 is formed in a portion of the casing 51 in the rotation direction θ (at least one portion in the rotation direction θ). In addition, the insulating section 71 passes from an inner circumferential surface of the cavity 51s to an outer circumferential surface of the casing 51 in the radial direction R. The insulating section 71 electrically cuts an annular electric flow path formed in the casing 51 in the rotation direction θ. Further, the insulating material filled into the through-groove is not limited to air or a vacuum and may be a material object such as insulating paper or a synthetic resin member. That is, "the slit-shaped insulating section" disclosed herein is not limited to an insulating section having a gap and may be an insulating section formed by a material object.

Next, the base 52 and the insulating sheet 53 of the core supporter 41 will be described.

As shown in FIG. 2B, the base 52 is formed in, for example, a plate shape which is along the axial direction Z. The base 52 has a surface 52a that is substantially parallel to the axial direction Z. The surface 52a of the base 52 faces the casings 51. The base 52 of the embodiment is commonly provided for the plurality of (for example, three) basic units 4. The base 52 overlaps the plurality of (for example, three) casings 51 corresponding to the U phase, the V phase and the W phase in the radial direction R. For example, the plurality of casings 51 are placed on the base 52 and supported by the base 52 from below. Further, "overlap" and "place" disclosed herein are not limited to the case in which the casing 51 and the base 52 come in direct contact with each other and may include the case in which another member (for example, the insulating sheet 53) is sandwiched therebetween. The plurality of casings 51 and the base 52 are connected to each other through the fixing members 54 (to be described below). The base 52 is formed of, for example, a non-magnetic material.

For example, the insulating sheet 53 may be formed along an upper surface of the base 52. The insulating sheet 53 is an example of "the electrical insulating member." For example, the insulating sheet 53 may be a sheet formed of insulating paper or a synthetic resin. The insulating sheet 53 of the embodiment is commonly provided for the plurality of (for example, three) basic units 4. The insulating sheet 53 may be formed in, for example, substantially the same quadrangular shape as the upper surface of the base 52. The insulating sheet 53 is sandwiched between the casing 51 and the base 52 (i.e., provided at a boundary between the casing 51 and the base 52) and electrically insulates the casing 51 from the base 52. The insulating sheet 53 is an example of "the second insulating section." The insulating sheet 53 passes through the core supporters 41 in the axial direction Z. Further, "the insulating section provided at the boundary between two members" disclosed herein is not limited to the insulating sheet 53 sandwiched between the two members and may be an insulating layer (a surface insulating layer) provided on a surface of at least one of the two members. Such an insulating layer is formed by performing, for example, insulation processing (oxidation processing, coating of an insulating material, or the like) on a surface of a member.

Figure 4:
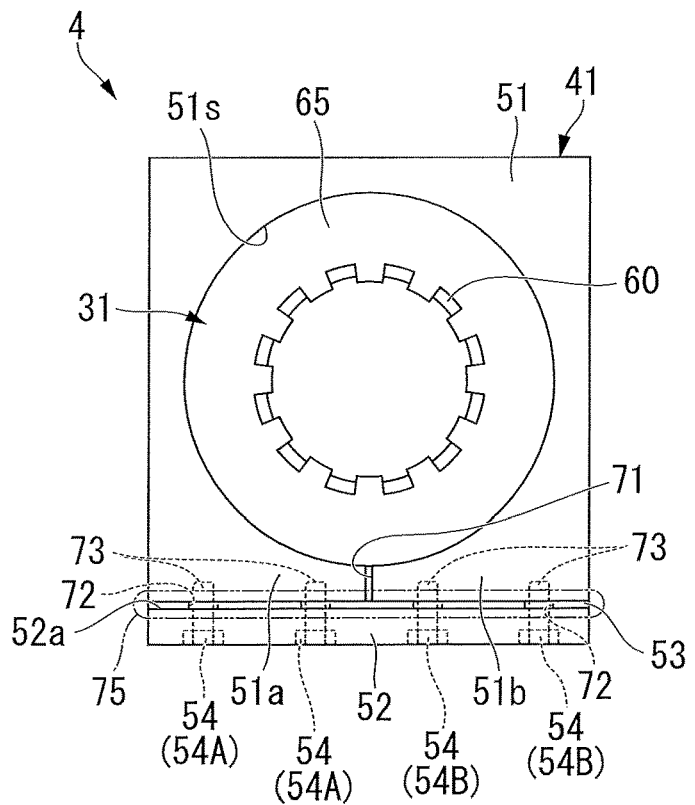
FIG. 4 is a front view showing the stator parts included in the basic unit of the first embodiment.

FIG. 4 is a front view showing stator parts included in the basic unit 4.

As shown in FIG. 4, for example, each of the plurality of fixing members 54 is attached to the casing 51 from the base 52 to fix the casing 51 to the base 52. The fixing member 54 is a fastening member such as a bolt, insulation processing (oxidation processing, and coating of an insulating material, or the like) is performed on a surface of the fastening member, or the fixing member 54 is constituted by an electrical insulating member. The fixing members 54 extends from the base 52 to the casing 51 by passing through the insulating sheet 53 in a direction in which the base 52 and the casing 51 overlap. Further, for example, "pass through" disclosed herein also includes extending on both sides of the insulating sheet 53 by passing through a hole 72 formed in the insulating sheet 53 (the insulating section).

As shown in FIG. 4, in the embodiment, the insulating section 71 of the casing 51 is formed in a central section of the casing 51 in a widthwise direction at a lower end portion of the stator 3. The insulating section 71 faces the insulating sheet 53 at a position over the insulating sheet 53. Here, the casing 51 includes a first portion 51a and a second portion 51b that are separated from each other on both sides of the insulating section 71 in the rotation direction θ. The first portion 51a and the second portion 51b of the casing 51 overlap the base 52 with the insulating sheet 53 sandwiched therebetween.

In the embodiment, the plurality of fixing members 54 include at least one first fixing member 54A and at least one second fixing member 54B. The first fixing member 54A includes a portion inserted into a hole 73 (for example, a screw hole) formed in the first portion 51a of the casing 51 and fixes the first portion 51a of the casing 51 to the base 52. Similarly, the second fixing member 54B includes a portion inserted into the hole 73 (for example, a screw hole) formed in the second portion 51b of the casing 51 and fixes the second portion 51b of the casing 51 to the base 52. The first fixing member 54A is an example of "the first fixing portion." The second fixing member 54B is an example of "the second fixing portion." Accordingly, portions of the casing 51 on both sides of the insulating section 71 are fixed to the base 52. In the embodiment, at least a portion of the insulating section 71 is disposed between the first fixing member 54A and the second fixing member 54B in the rotation direction θ. Further, "the first fixing portion" and "the second fixing portion" are not limited to a fastening member such as a bolt and may be a fixing portion (an adhering section) formed of an adhesive agent or the like.

In addition, when seen from another viewpoint, the core supporters 41 are divided into at least the casing 51 and the base 52. The casing 51 is an example of "the first member." The base 52 is an example of "the second member." Then, the core supporters 41 includes a connecting section 75 in which the casing 51 and the base 52 are connected, and an insulating sheet (an insulating section) 53 provided in the connecting section 75 and configured to electrically insulate the casing 51 from the base 52. Further, the connecting section 75 is, for example, a section obtained by combining an end portion of the casing 51 adjacent to the base 52 and an end portion of the base 52 adjacent to the casing 51.

The insulating sheet 53 forms an example of a slit-shaped insulating section formed in the core supporters 41 in the axial direction Z when the core supporters 41 including the casing 51 and the base 52 are viewed integrally. That is, "the slit-shaped insulating section" disclosed herein may be an insulating section formed by an electrical insulating member or the like provided in a separate portion of a plurality of members and sandwiched between the plurality of members.

Next, an action of the rotating electrical machine 1 of the embodiment will be described.

Figure 5:
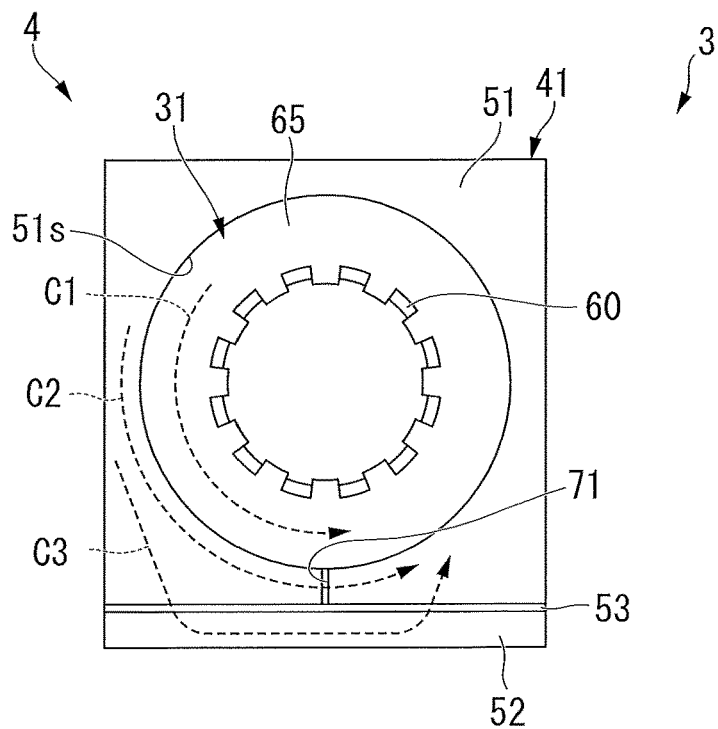
FIG. 5 is a view showing an action of the rotating electrical machine of the first embodiment.

FIG. 5 is a view showing an action of the rotating electrical machine 1 of the embodiment.

As shown in FIG. 5, upon driving of the rotating electrical machine 1, according to rotation driving of the rotating electrical machine 1, circulating currents (induced current, surrounding eddy current) C1, C2 and C3 flowing around the rotary center axis C would occur. However, in the embodiment, the stator core 65 is formed by a pressed powder core. For this reason, generation of the circulating current C1 flowing in the stator core 65 is suppressed first. Further, in the embodiment, the casing 51 has the slit-shaped insulating section 71 in the axial direction Z. For this reason, an electric flow path in the casing 51 in the rotation direction θ is blocked. Accordingly, generation of the circulating current C2 flowing through the casing 51 is suppressed. Further, in the embodiment, the insulating sheet 53 is provided on the boundary between the casing 51 and the base 52. Accordingly, an electric flow path configured to connect the casing 51 and the base 52 is blocked. Accordingly, generation of the circulating current C3 bypassing and flowing around the base 52 from the casing 51 is suppressed. As a result, according to rotation driving of the rotating electrical machine 1, generation of the circulating current flowing around the rotary center axis C can be suppressed in all of the stator core 65, the casing 51 and the base 52.

According to the rotating electrical machine 1 of the above-mentioned configuration, improvement in performance of the rotating electrical machine 1 can be achieved. That is, for example, when the core supporter configured to support the stator core is installed in the rotating electrical machine, an induced voltage may be decreased due to an influence of the circulating current generated in the core supporter. When the induced voltage is decreased, for example, a decrease in dynamic torque of the rotating electrical machine within a high speed rotation region may occur.

Here, in the rotating electrical machine 1 of the embodiment, the core supporter 41 configured to support the stator core 65 has the slit-shaped insulating section 71 in the axial direction Z of the shaft 12. According to the above-mentioned configuration, generation of the circulating current in the core supporters 41 can be suppressed. Accordingly, a decrease in the induced voltage can be suppressed, and improvement in performance of the rotating electrical machine 1 (for example, improvement of a dynamic torque within the high speed rotation region) can be achieved. In addition, in the embodiment, since the core supporters 41 configured to support the stator core 65 are provided, according to rotation driving of the rotating electrical machine 1, even when a magnetic force in the rotation direction and, a direction of which varies intermittently, is generated with respect to the magnetic pole section of the stator core 65, the stator core 65 can be supported and fixed by the core supporters 41 with high stiffness. For this reason, generation of vibration or noise due to the stator core 65 can be reduced.

In addition, in order to achieve improvement in efficiency of the rotating electrical machine, it is conceived that the stator core or the like may be formed using a pressed powder core. However, a core formed by a pressed powder core has a mechanical strength lower than that of a core of the related art having a general structure. For this reason, when a core formed by a pressed powder core is employed, a core supporter configured to reinforce the core needs to be provided. When such a core supporter is provided, an influence due to the above-mentioned circulating current occurs.

Meanwhile, in the rotating electrical machine 1 of the embodiment, the slit-shaped insulating section 71 is provided as described above, and generation of the circulating current is suppressed. For this reason, according to the rotating electrical machine 1 of the embodiment, improvement of efficiency of the rotating electrical machine 1 is achieved by forming the stator core 65 using the pressed powder core, high stiffness of the stator core 65 formed by the pressed powder core is achieved by installing the core supporters 41 configured to support the stator core 65, and further, the circulating current generated by installing the core supporters 41 is suppressed by the insulating section 71. Accordingly, the rotating electrical machine 1 can simultaneously realize additional improvement in performance and high stiffness. Accordingly, improvement in reliability or life time of the rotating electrical machine 1, a decrease in noise, or the like, can also be achieved.

In the embodiment, the core supporters 41 include the casing 51, the base 52 and the insulating sheet 53. The insulating sheet 53 is provided in the boundary between the casing 51 and the base 52 to electrically insulate the casing 51 from the base 52. According to the above-mentioned configuration, generation of the circulating current C3 bypassing and flowing around the base 52 from the casing 51 can be suppressed. Accordingly, performance of the rotating electrical machine 1 can be further increased.

In addition, when seen from another viewpoint, in the embodiment, the core supporter 41 is divided into at least the casing 51 and the base 52, and includes the connecting section 75 in which the casing 51 and the base 52 are connected each other, and the insulating sheet 53 provided in the connecting section 75 to electrically insulate the casing 51 and the base 52. According to the above-mentioned configuration, generation of the circulating current C3 bypassing and flowing around the base 52 from the casing 51 can be suppressed. Accordingly, performance of the rotating electrical machine 1 can be further increased.

Here, when the slit-shaped insulating section 71 is formed in the casing 51, the stiffness of the casing 51 decreases around the insulating section 71, which may cause vibration (e.g., noise). Here, in the embodiment, the stiffness around the insulating section 71 is increased by the plurality of fixing members 54. That is, the casing 51 of the embodiment includes the first portion 51a and the second portion 51b divided on both sides of the insulating section 71 in the rotation direction θ. Then, the first fixing member 54A fixes the first portion 51a of the casing 51 to the base 52. The second fixing member 54B fixes the second portion 51b of the casing 51 to the base 52. According to the above-mentioned configuration, a decrease in stiffness of the casing 51 around the slit-shaped insulating section 71 can be suppressed, and high stiffness as a whole can be maintained. If the high stiffness of the casing 51 can be maintained, even when a magnetic force in the rotation direction θ and, a direction of which varies intermittently, is generated with respect to the stator magnetic poles Ms according to rotation driving, vibration (e.g., noise) or the like due to a decrease in stiffness can be suppressed. Further, when the above-mentioned fixing members 54 are provided, the circulating current generated in the casing 51 may flow to the base 52 through the fixing members 54. For this reason, it is preferable that the fixing member 54 is formed by performing insulation processing (oxidation processing, coating of an insulating material, or the like) on the surface of the member or may be constituted by an electrical insulating member.

In the embodiment, the first fixing member 54A includes a portion inserted into the hole 73 formed in the first portion 51a of the casing 51. The second fixing member 54B includes a portion inserted into the hole 73 formed in the second portion 51b of the casing 51. Then, at least a portion of the insulating section 71 of the casing 51 is disposed between the first fixing member 54A and the second fixing member 54B. According to the above-mentioned configuration, a periphery of the insulating section 71 is more reliably reinforced by the first fixing member 54A and the second fixing member 54B, a decrease in stiffness of the casing 51 around the insulating section 71 can be suppressed, and higher stiffness as a whole can be maintained.

Variant

Next, one variant of the first embodiment will be described.

Figure 6:
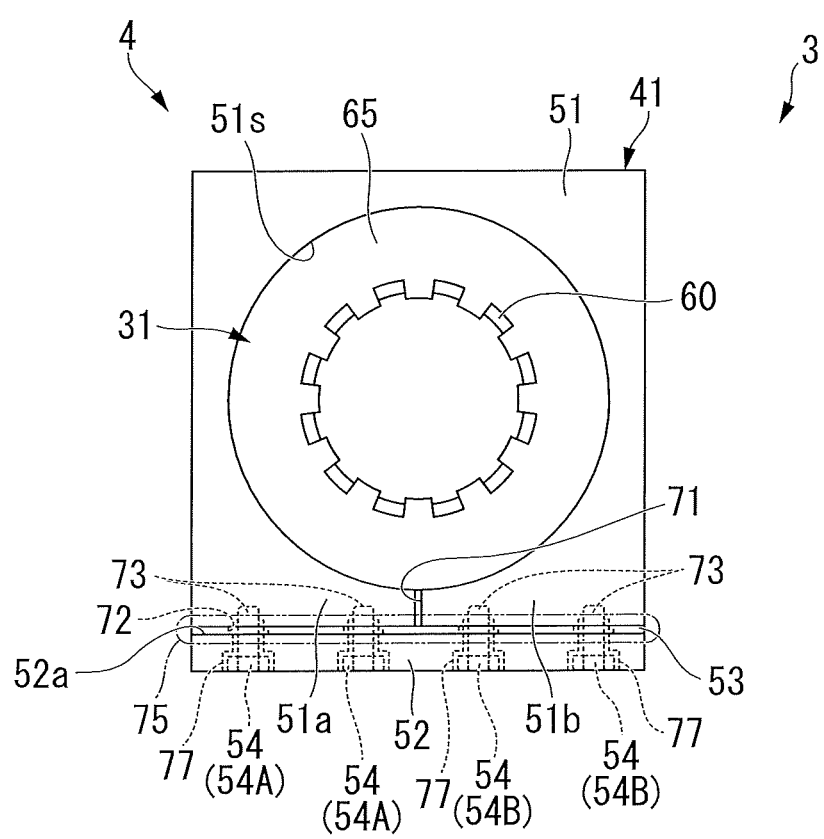
FIG. 6 is a cross-sectional view showing stator parts of a variant of the first embodiment.

FIG. 6 is a cross-sectional view showing stator parts of the variant of the first embodiment.

As shown in FIG. 6, in the embodiment, an insulating member 77 configured to cover outer circumferential surfaces of the fixing members 54 is provided. The insulating member 77 is, for example, a resin collar into which the fixing members 54 are inserted. The insulating member 77 passes through the insulating sheet 53 from the base 52 to reach the casing 51. The insulating member 77 electrically insulates between the base 52 and the fixing members 54. According to the above-mentioned configuration, even when insulation processing is not performed on the fixing members 54 or the fixing members 54 are not formed of an electrical insulating member, the flow of the circulating current flowing to the base 52 from the casing 51 through the fixing members 54 can be blocked. Accordingly, further improvement in performance of the rotating electrical machine 1 can be achieved.

Second Embodiment

Next, a rotating electrical machine 1 of a second embodiment will be described with reference to FIGS. 7A to 9B. The embodiment is distinguished from the first embodiment in that the casing 51 common to the plurality of basic units 4 is provided. Further, configurations other than those described below are similar to the first embodiment.

Figure 7A:
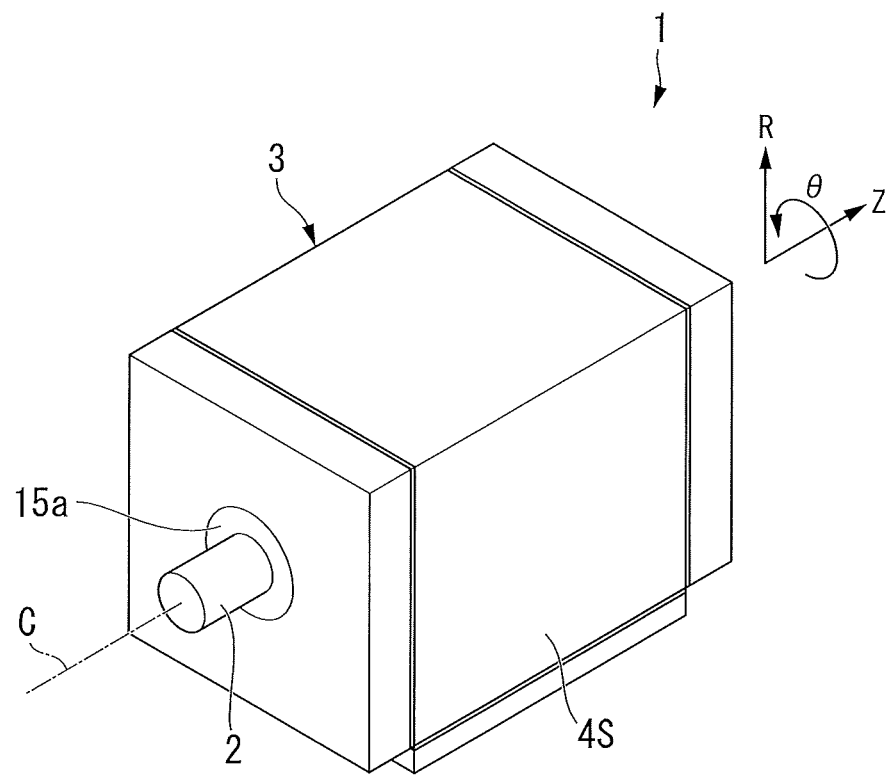
FIG. 7A is a perspective view showing a rotating electrical machine of a second embodiment as a whole.
Figure 7B:
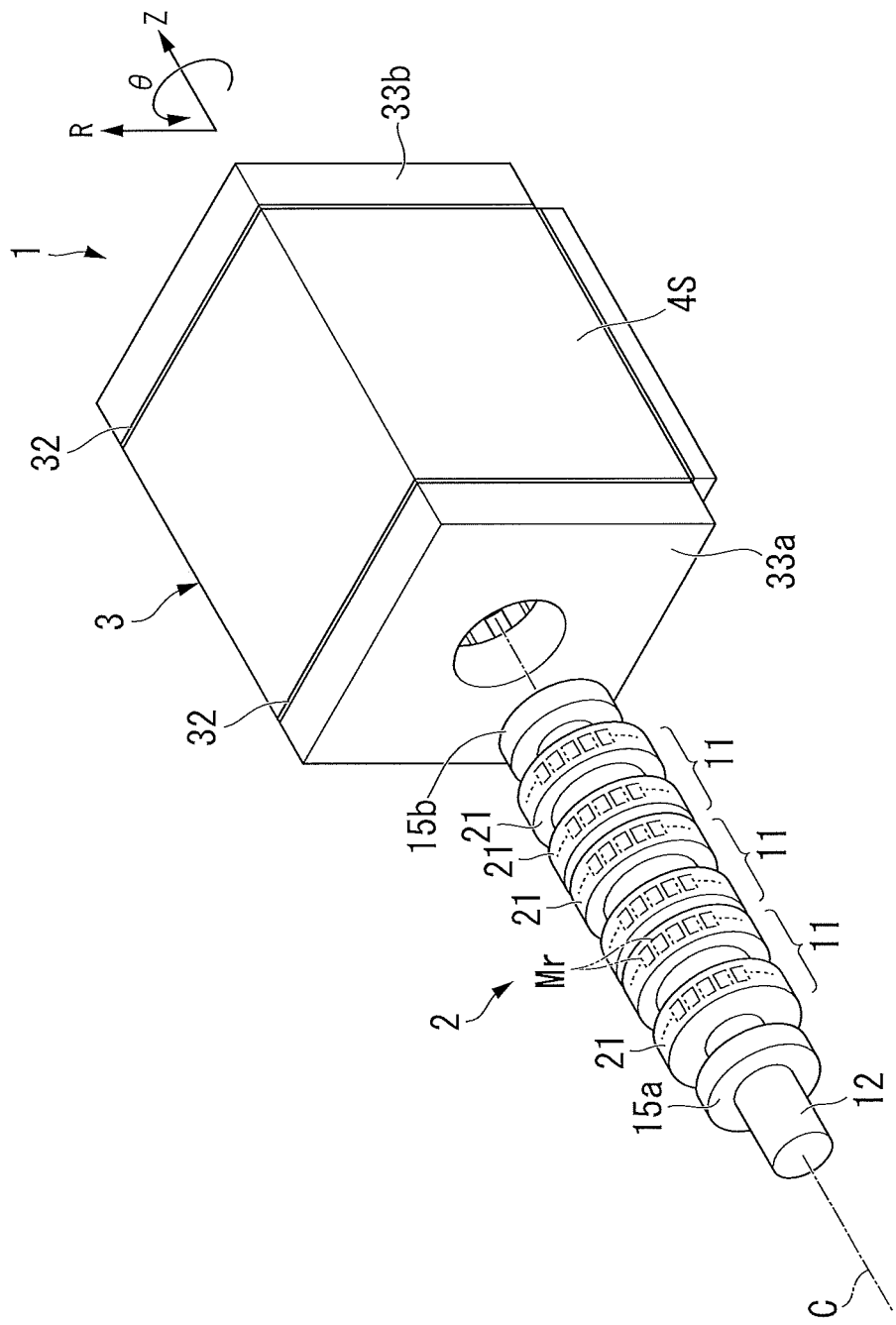
FIG. 7B is a partially exploded perspective view showing the rotating electrical machine of the second embodiment.

FIG. 7A is a perspective view showing the rotating electrical machine 1 of the embodiment. FIG. 7B is a partially exploded perspective view showing the rotating electrical machine 1 shown in FIG. 7A.

As shown in FIG. 7B, in the embodiment, the rotating electrical machine 1 includes a basic unit set 4S corresponding to a plurality of (for example, three) basic units 4 described in the first embodiment.

Figure 8A:
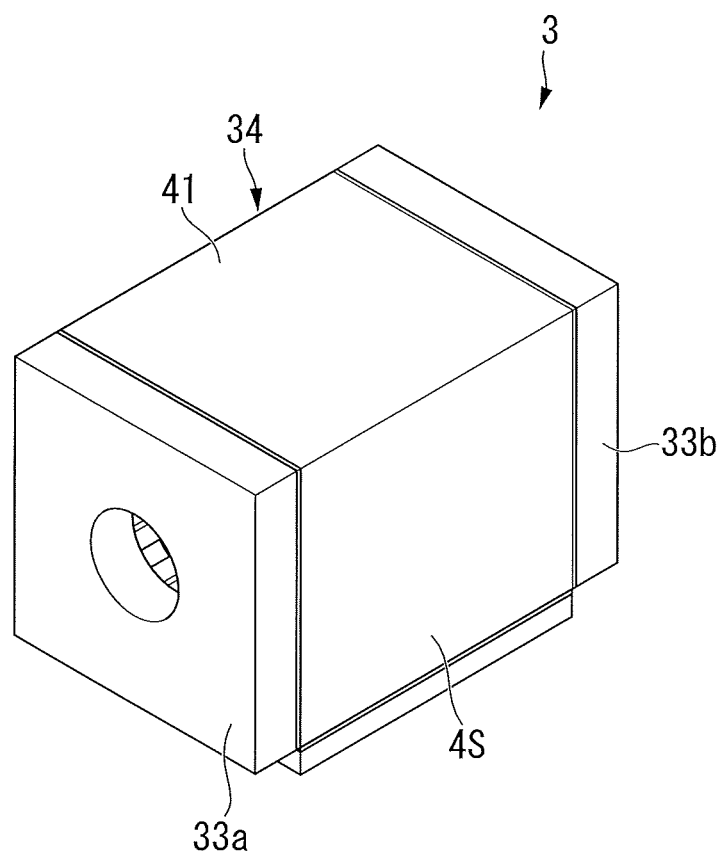
FIG. 8A is a perspective view showing a stator of the second embodiment.
Figure 8B:
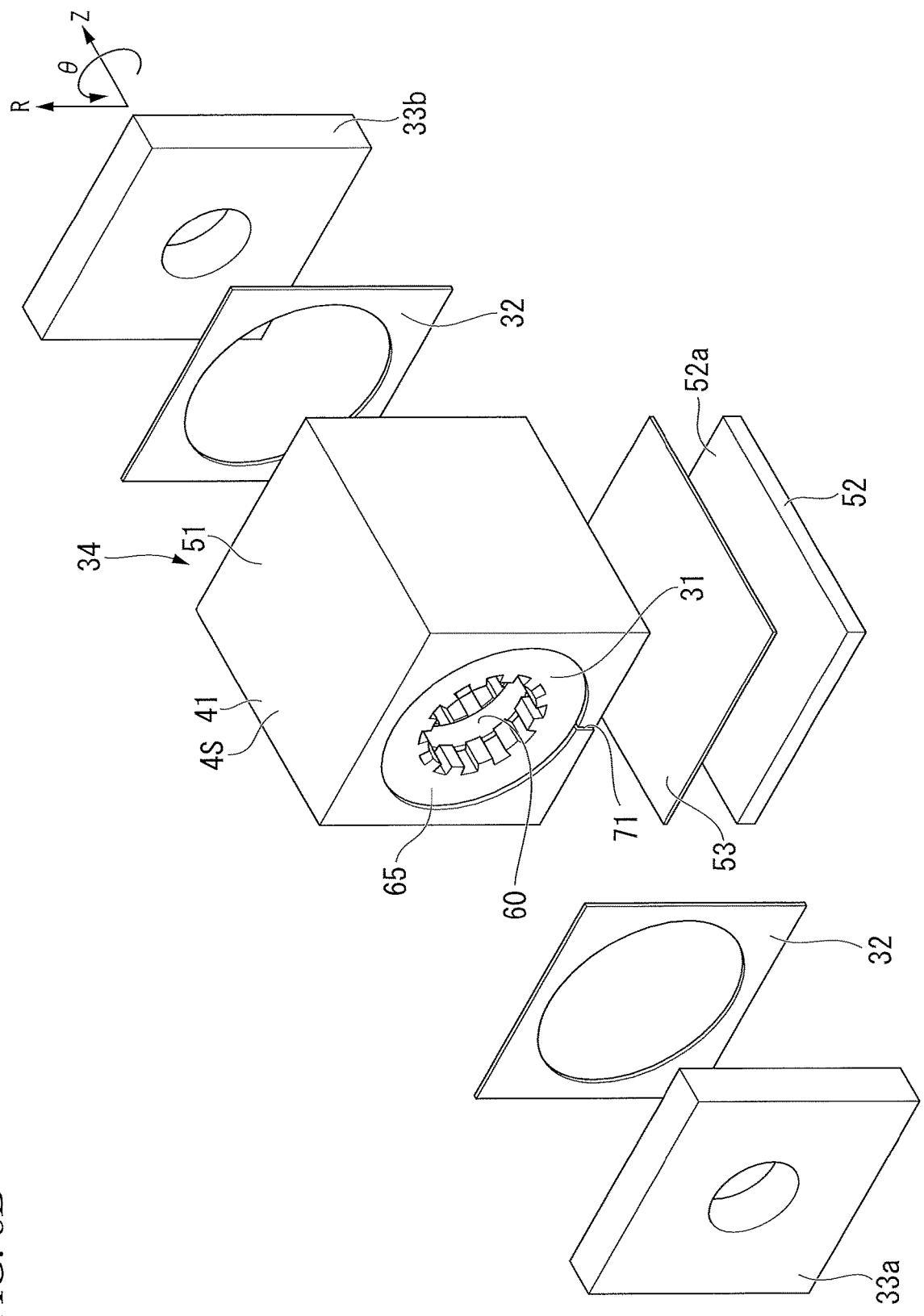
FIG. 8B is a partially exploded perspective view showing the stator of the second embodiment.
Figure 9A:
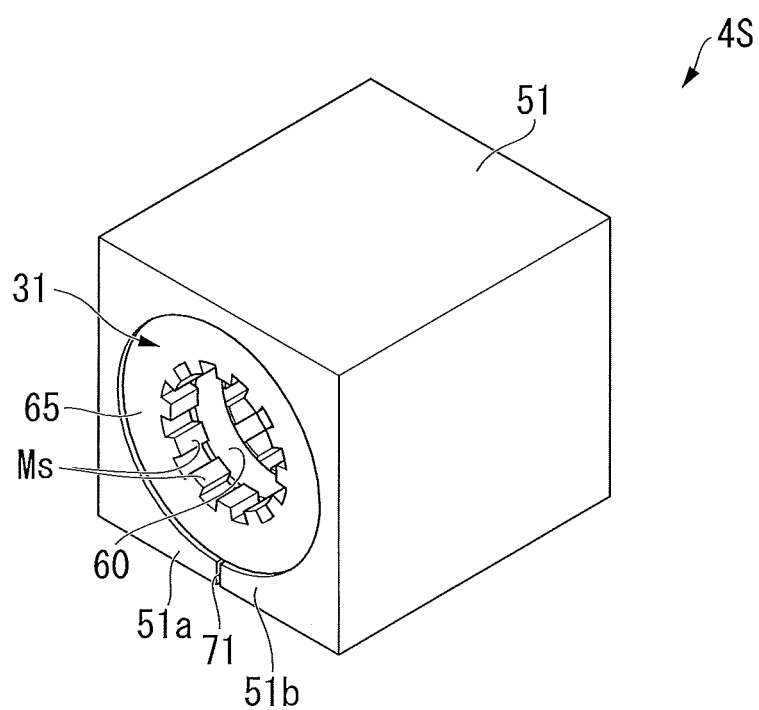
FIG. 9A is a perspective view showing stator parts included in a basic unit set of the second embodiment.
Figure 9B:
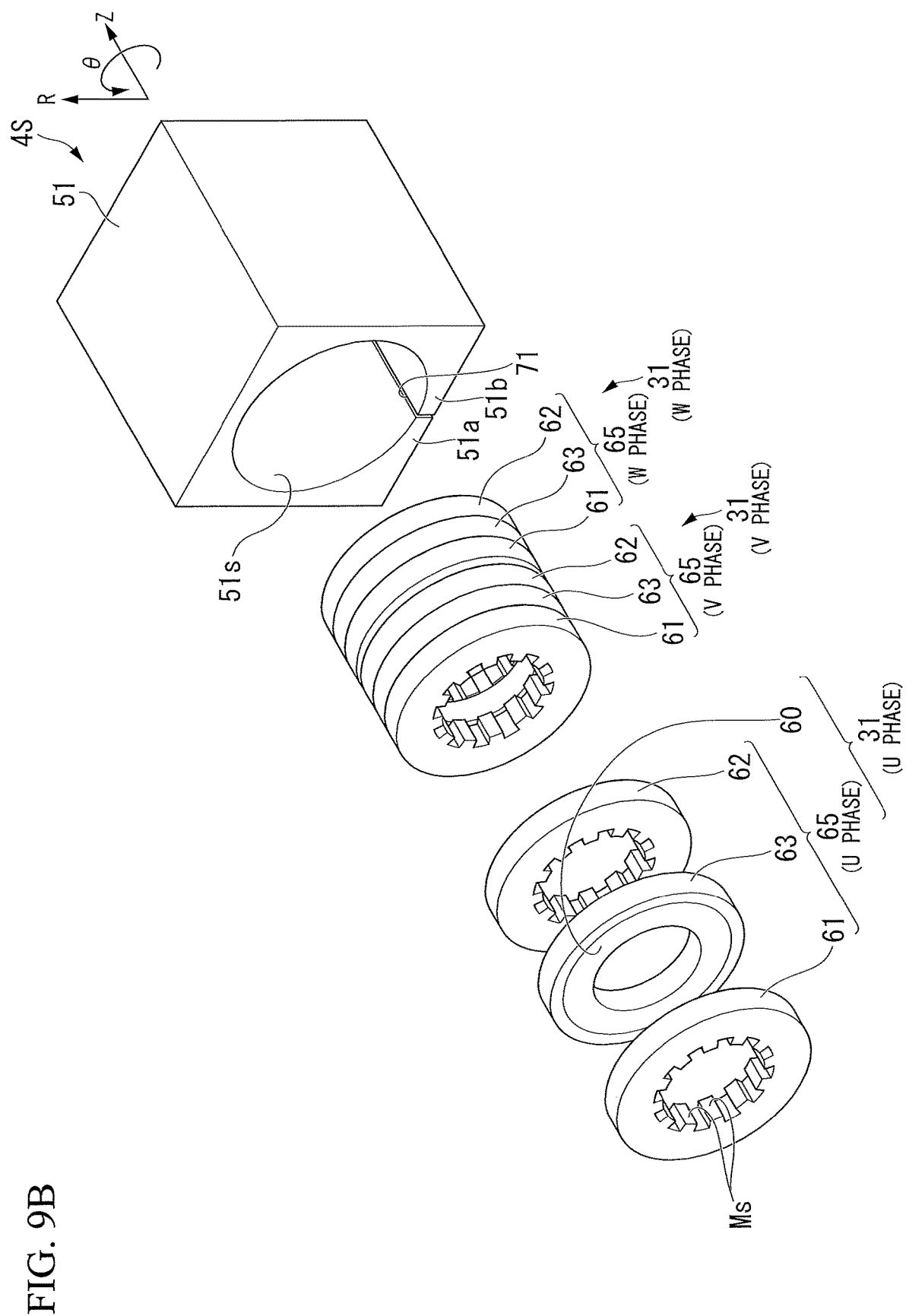
FIG. 9B is a partially exploded perspective view showing the stator parts included in the basic unit set of the second embodiment.

FIG. 8A is a perspective view showing the stator 3 of the embodiment. FIG. 8B is a partially exploded perspective view showing the stator 3 shown in FIG. 8A. FIG. 9A is a perspective view showing stator parts included in the basic unit set 4S of the embodiment. FIG. 9B is a partially exploded perspective view showing the stator parts included in the basic unit set 4S shown in FIG. 9A.

For example, as shown in FIG. 8B, in the embodiment, for example, the stator 3 includes the plurality of (for example, three) armatures 31 (see FIG. 9B) included in the basic unit set 4S, the plurality of spacers 32, the pair of bearing holders 33a and 33b, and the support structure 34 configured to integrally support the plurality of armatures 31.

In the embodiment, the support structure 34 includes, for example, one core supporter 41. The core supporter 41 includes the casing 51, the base 52, the insulating sheet 53 and the plurality of fixing members 54 (see FIG. 4). The casing 51 of the embodiment includes, for example, the stator cores 65 of the three armatures 31 of the U phase, the V phase and the W phase, which are integrally installed therein. In other words, the casing 51 of the embodiment is a member commonly provided for the plurality of armatures 31 and, for example, integrating the casing 51 of the three basic units 4 of the first embodiment. In this embodiment also, the insulating section 71 is formed in the axial direction Z and passes through the casing 51 in the axial direction Z.

According to the above-mentioned configuration, like the first embodiment, improvement in performance of the rotating electrical machine 1 can be achieved.

Third Embodiment

Next, a rotating electrical machine 1 of a third embodiment will be described with reference to FIGS. 10A to 13. The embodiment is distinguished from the first embodiment in that the casing 81 of the core supporter 41 is a gate type. Further, configurations other than those described below are similar to the first embodiment. In addition, since the entire configuration of the rotating electrical machine 1 of the embodiment is substantially the same as the entire configuration of the rotating electrical machine 1 of the first embodiment, an illustration of the entire configuration is omitted.

Figure 10A:
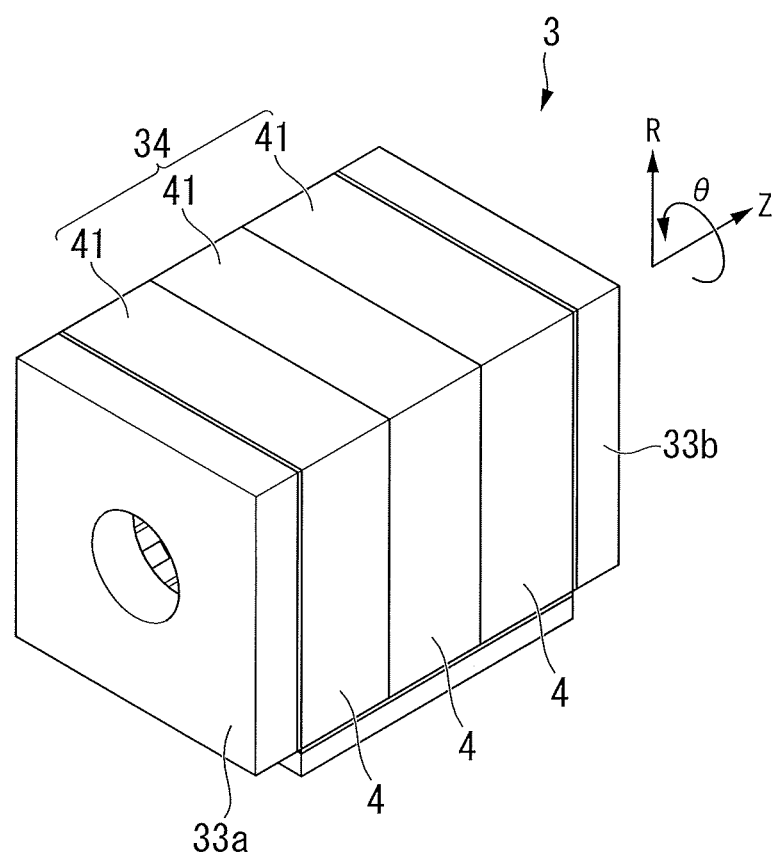
FIG. 10A is a perspective view showing a stator of a third embodiment.
Figure 10B:
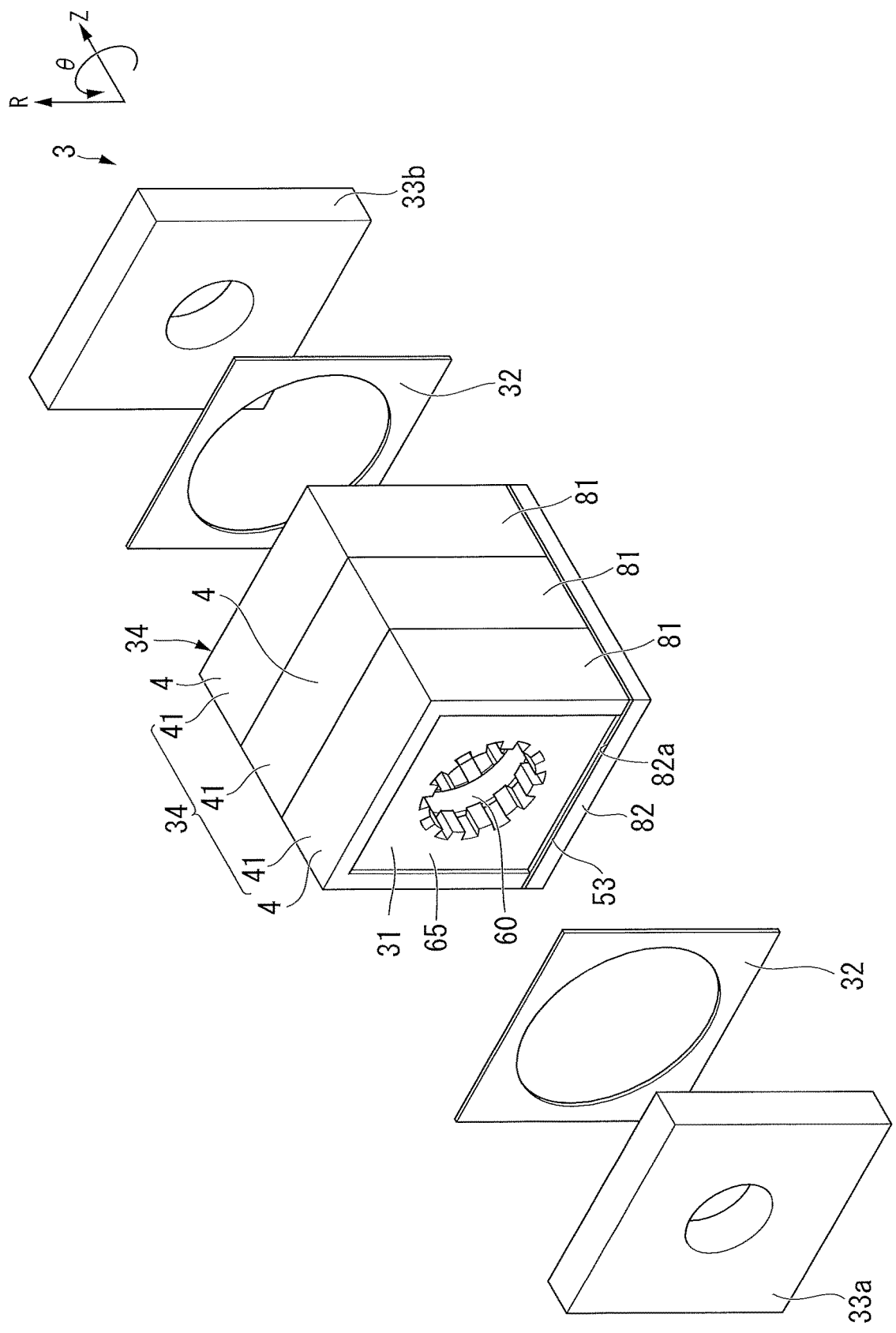
FIG. 10B is a partially exploded perspective view showing the stator of the third embodiment.

FIG. 10A is a perspective view showing the stator 3 of the embodiment. FIG. 10B is a partially exploded perspective view showing the stator 3 shown in FIG. 10A.

For example, as shown in FIG. 10B, the stator 3 includes, for example, the plurality of (for example, three) armatures 31 disposed in parallel in the axial direction Z, the plurality of spacers 32, the pair of bearing holders 33a and 33b, and the support structure 34 configured to support, for example, the plurality of armatures 31.

The support structure 34 includes, for example, the plurality of core supporters 41. The plurality of core supporters 41 are disposed to correspond to the basic units 4 that are different from each other. Each of the core supporters 41 is formed in a substantially annular shape along a external form of the stator core 65 (for example, around the external form). Each of the core supporters 41 is divided into, for example, at least a casing 81 and a base 82 in the rotation direction θ. The casing 81 is an example of "the first member." The base 82 is an example of "the second member." In addition, each of the core supporters 41 includes the insulating sheet 53 and the plurality of fixing members 54 (see FIG. 12). Further, some or all of the casing 81, the base 82 and the insulating sheet 53 included in the plurality of core supporters 41 may be formed integrally with all of the plurality of core supporters 41. For example, in the embodiment, each of the base 82 and the insulating sheet 53 is formed integrally with all of the plurality of core supporters 41.

Figure 11A:
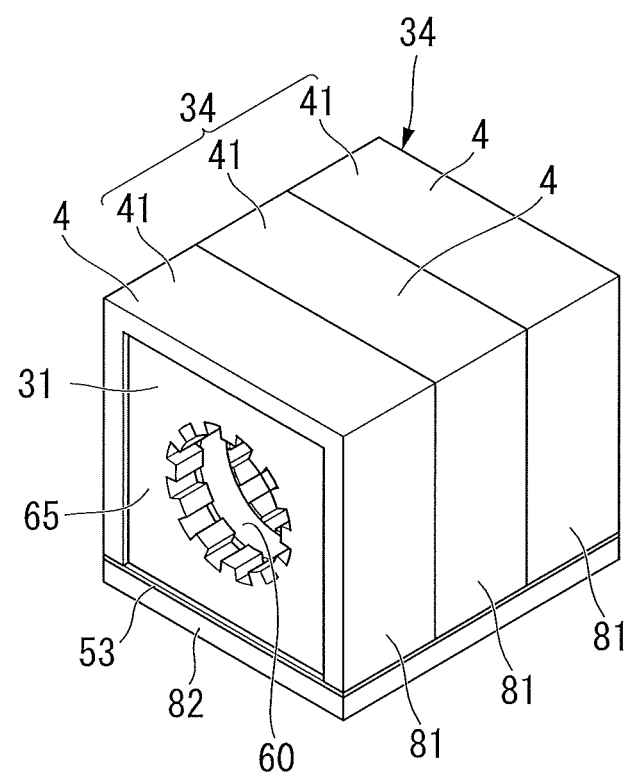
FIG. 11A is a perspective view showing stator parts included in a basic unit of the third embodiment.
Figure 11B:
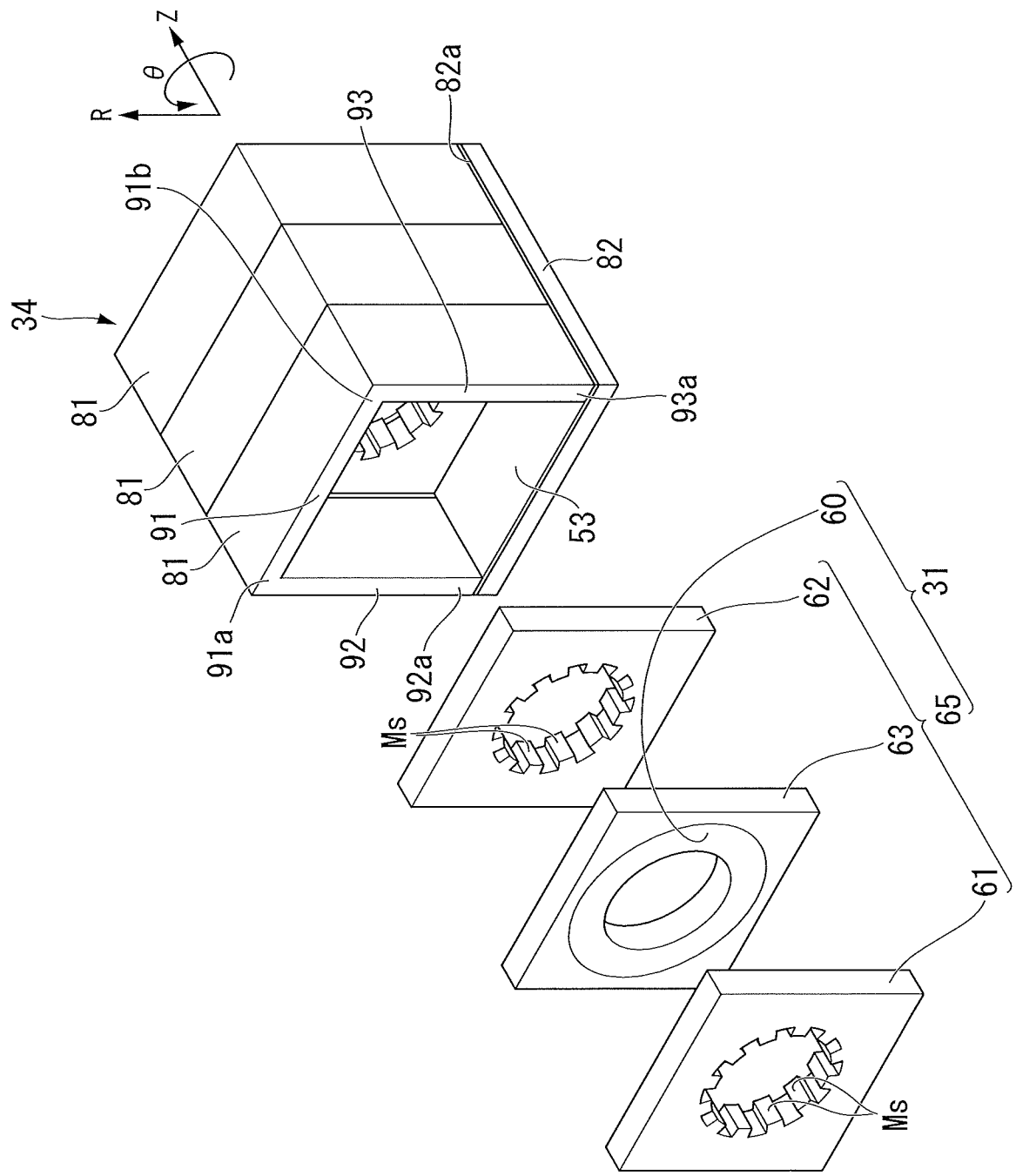
FIG. 11B is a partially exploded perspective view showing the stator parts included in the basic unit of the third embodiment.

FIG. 11A is a perspective view showing stator parts included in the basic units 4 of the embodiment. FIG. 11B is a partially exploded perspective view showing the stator parts included in the basic units 4 shown in FIG. 11A.

For example, as shown in FIG. 11B, the stator 3 included in the one basic unit 4 includes, for example, at least the armature 31 and the casing 81. The armature 31 includes the winding 60, the first stator core 61, the second stator core 62 and the third stator core 63. In the embodiment, each of the first stator core 61, the second stator core 62 and the third stator core 63 is formed in a substantially annular shape having, for example, a quadrangular external form. Accordingly, the stator core 65 is formed in a substantially annular shape having a quadrangular external form.

The casing 81 of the embodiment is formed as a gate type along three sides of the stator core 65 and fitted onto the stator core 65, from the outside. The casing 81 includes a first portion 91, a second portion 92 and a third portion 93. The first portion 91 is disposed at a position opposite to the base 82 with respect to the stator core 65. The first portion 91 includes a first end portion 91a and a second end portion 91b disposed at an opposite side to the first end portion 91a. The second portion 92 extends from the first end portion 91a of the first portion 91 toward the base 82. The second portion 92 includes a first connecting end portion 92a connected to the base 82. The third portion 93 extends from the second end portion 91b of the first portion 91 toward the base 82. The third portion 93 includes a second connecting end portion 93a connected to the base 82. The casing 81 is formed of, for example, a non-magnetic material.

The base 82 is formed in a plate shape that is along the axial direction Z. The base 82 has a surface 82a that is substantially parallel to the axial direction Z. The surface 82a of the base 82 faces the casing 81. The base 82 of the embodiment is commonly provided for the plurality of (for example, three) basic units 4. The base 82 faces the stator core 65 from a direction different from the casing 81. The base 82 overlaps the plurality of (for example, three) casings 81 corresponding to the U phase, the V phase and the W phase in the radial direction R. For example, the plurality of casings 81 are placed on the base 82 and supported using the base 82 from below. The plurality of casings 81 and the base 82 are connected to each other by the fixing members 54 (to be described below). The base 82 is formed of, for example, a non-magnetic material.

The insulating sheet 53 of the embodiment is commonly provided for the plurality of (for example, three) basic units 4. The insulating sheet 53 is sandwiched between the casing 81 and the base 82 (i.e., installed at a boundary between the casing 81 and the base 82) and electrically insulates the casing 81 and the base 82. In the embodiment, the insulating sheet 53 is installed between the first connecting end portion 92a of the casing 81 and the base 82 and between the second connecting end portion 93a of the casing 81 and the base 82.

Figure 12:
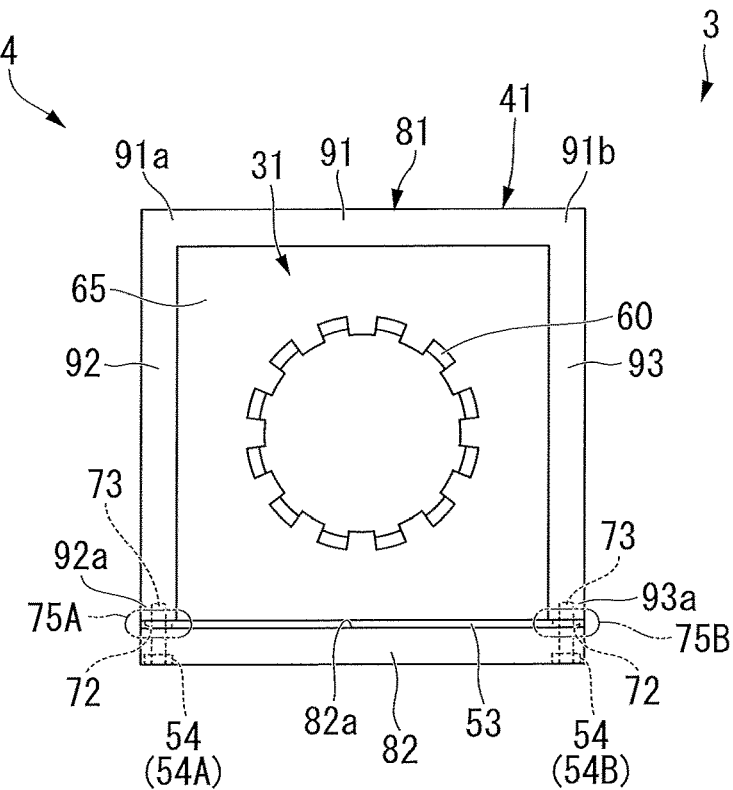
FIG. 12 is a front view showing the stator parts included in the basic unit of the third embodiment.

When seen from another viewpoint, the core supporter 41 of the embodiment includes a first connecting section 75A and a second connecting section 75B (see FIG. 12). The first connecting section 75A is a combination of the first connecting end portion 92a of the casing 81 and a portion of the base 82 adjacent to the first connecting end portion 92a. The second connecting section 75B is a combination of the second connecting end portion 93a of the casing 81 and a portion of the base 82 adjacent to the second connecting end portion 93a. In each of the first connecting section 75A and the second connecting section 75B, for example, the casing 81 and the base 82 are connected by the fixing members 54 (to be described below). In the embodiment, the insulating sheet 53 is provided in each of the first connecting section 75A and the second connecting section 75B and electrically insulates the casing 81 and the base 82 in each of the first connecting section 75A and the second connecting section 75B.

In addition, the insulating sheet 53 foil is an example of the slit-shaped insulating section formed in the core supporters 41 in the axial direction Z when the core supporter 41 including the casing 81 and the base 82 is viewed integrally. The insulating sheet 53 of the embodiment is an example of "the first insulating section." The insulating sheet 53 passes through the core supporters 41 in the axial direction Z.

FIG. 12 is a front view showing stator parts included in the basic unit 4. As shown in FIG. 12, for example, each of the plurality of fixing members 54 is attached to the casing 81 from the base 82, and fixes the casing 81 to the base 82. The fixing member 54 is a fastening member such as a bolt. For example, the fixing member 54 extends over the base 82 and the casing 81 by passing through the insulating sheet 53 in a direction in which the casing 81 and the base 82 overlap.

In the embodiment, the plurality of fixing members 54 include at least one first fixing member 54A and at least one second fixing member 54B. The first fixing member 54A includes a portion inserted into the hole 73 formed in the second portion 92 of the casing 81 and fixes the second portion 92 of the casing 81 to the base 82. Meanwhile, the second fixing member 54B includes a portion inserted into the hole 73 formed in the third portion 93 of the casing 81 and fixes the third portion 93 of the casing 81 to the base 82. The first fixing member 54A is an example of "the first fixing portion." The second fixing member 54B is an example of "the second fixing portion." Further, "the first fixing portion" and "the second fixing portion" are not limited to the fastening member such as a bolt and may be a fixing portion (an adhering section) formed of an adhesive agent or the like.

Next, an action of the rotating electrical machine 1 of the embodiment will be described.

Figure 13:
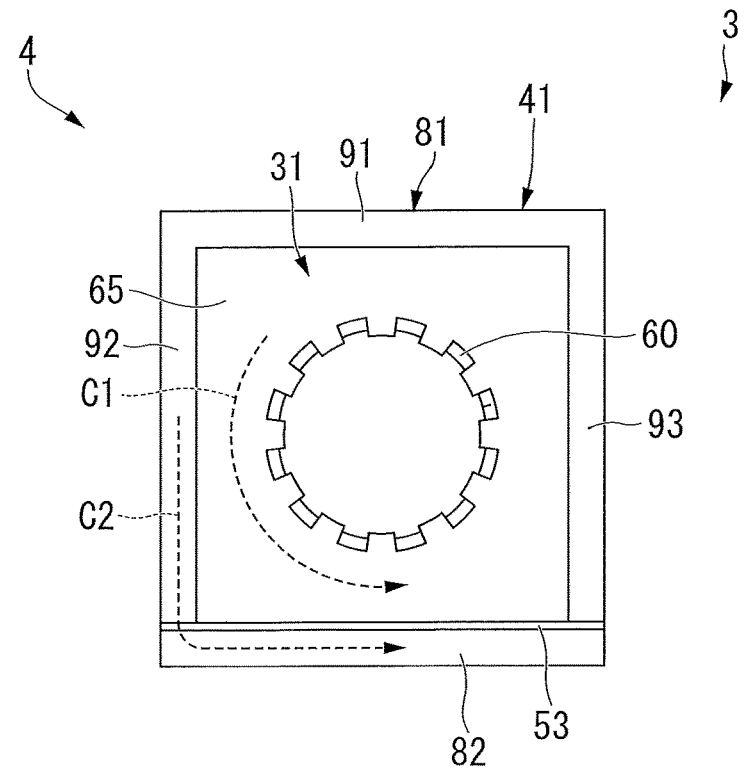
FIG. 13 is a view showing an action of a rotating electrical machine of the third embodiment.

FIG. 13 is a view showing an action of the rotating electrical machine 1 of the embodiment.

In the embodiment, the stator core 65 is formed by a pressed powder core. For this reason, generation of the circulating current C1 flowing in the stator core 65 is suppressed first. Further, in the embodiment, the insulating sheet 53 is provided in the boundary between the casing 81 and the base 82. Accordingly, an electric flow path that connects the casing 81 and the base 82 is blocked. Accordingly, generation of the circulating current C2 flowing through the casing 81 and the base 82 serving as a path is suppressed. As a result, generation of the circulating current around the rotary center axis C according to rotation driving of the rotating electrical machine 1 can be suppressed in both of the stator core 65 and the core supporters 41.

According to the rotating electrical machine 1 having the above-mentioned configuration, like the first embodiment, improvement in performance of the rotating electrical machine 1 can be achieved. For example, in the embodiment, the core supporters 41 are divided into at least the casing 81 and the base 82 in the rotation direction θ and have the connecting sections 75A and 75B in which the casing 81 and the base 82 are connected. The insulating sheet 53 is provided in the connecting sections 75A and 75B and electrically insulates between the casing 81 and the base 82. According to the above-mentioned configuration, even when the core supporters 41 having a substantially annular shape are formed by the casing 81 and the base 82, generation of the circulating current C2 flowing through the core supporters 41 is suppressed. Accordingly, the performance of the rotating electrical machine 1 can be improved.

In the embodiment, the fixing members 54 pass through the insulating sheet 53 in the direction in which the casing 81 and the base 82 overlap to fix the casing 81 to the base 82. According to the above-mentioned configuration, when the core supporters 41 are divided into the casing 81 and the base 82 to allow the insulating sheet 53 to be provided, a decrease in stiffness of the core supporters 41 in the separating portion between the casing 81 and the base 82 is suppressed, and high stiffness as a whole can be maintained. Accordingly, according to rotation driving of the rotating electrical machine 1, for example, even when a magnetic force in the rotation direction θ and, a direction of which varies intermittently, is generated with respect to the stator magnetic poles Ms, vibration (e.g., noise) or the like due to a decrease in stiffness can be suppressed.

Fourth Embodiment

Next, a rotating electrical machine 1 of a fourth embodiment will be described with reference to FIGS. 14A to 18. The embodiment is distinguished from the third embodiment in that the core supporters 41 are divided into a first casing member 101 and a second casing member 102, and the like. Further, configurations other than those described below are similar to the third embodiment.

Figure 14A:
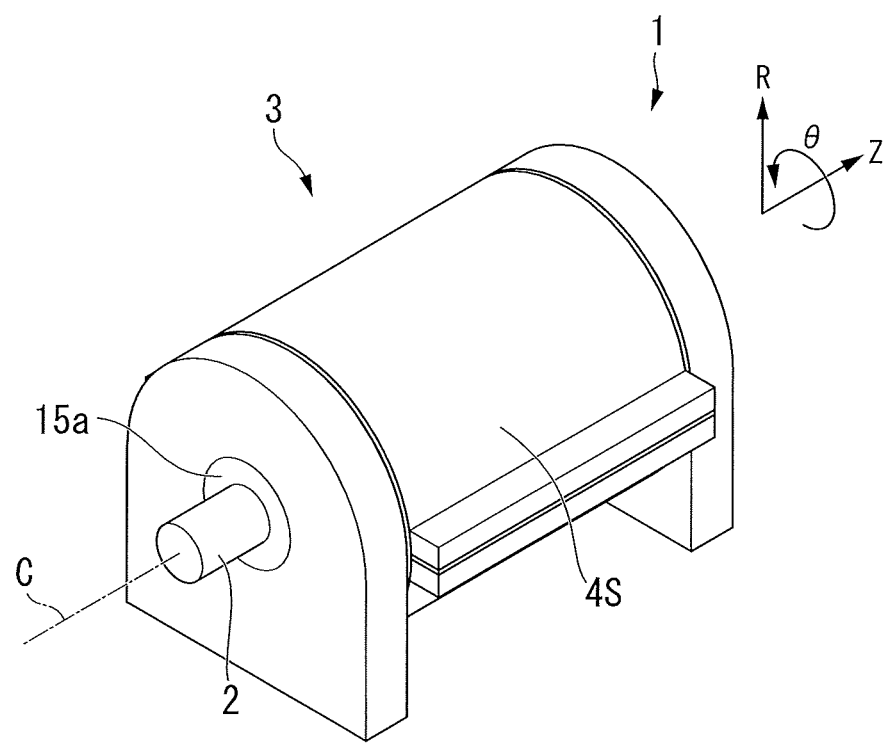
FIG. 14A is a perspective view showing a rotating electrical machine of a fourth embodiment as a whole.
Figure 14B:
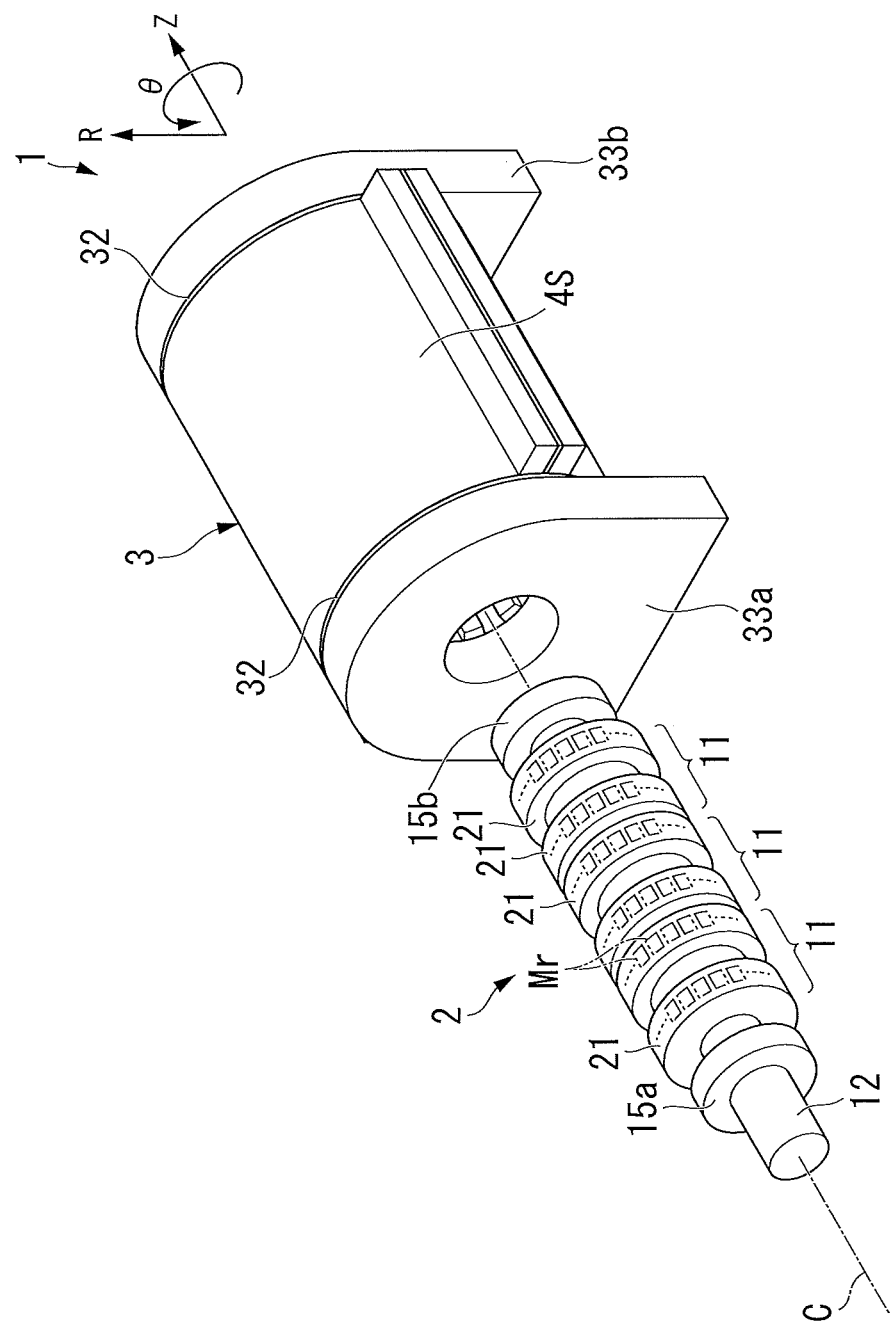
FIG. 14B is a partially exploded perspective view showing the rotating electrical machine of the fourth embodiment.

FIG. 14A is a perspective view showing the rotating electrical machine 1 of the embodiment. FIG. 14B is a partially exploded perspective view showing the rotating electrical machine 1 shown in FIG. 14A.

For example, as shown in FIG. 14B, in the embodiment, the rotating electrical machine 1 includes one basic unit set 4S corresponding to the plurality of (for example, three) basic units 4.

Figure 15A:
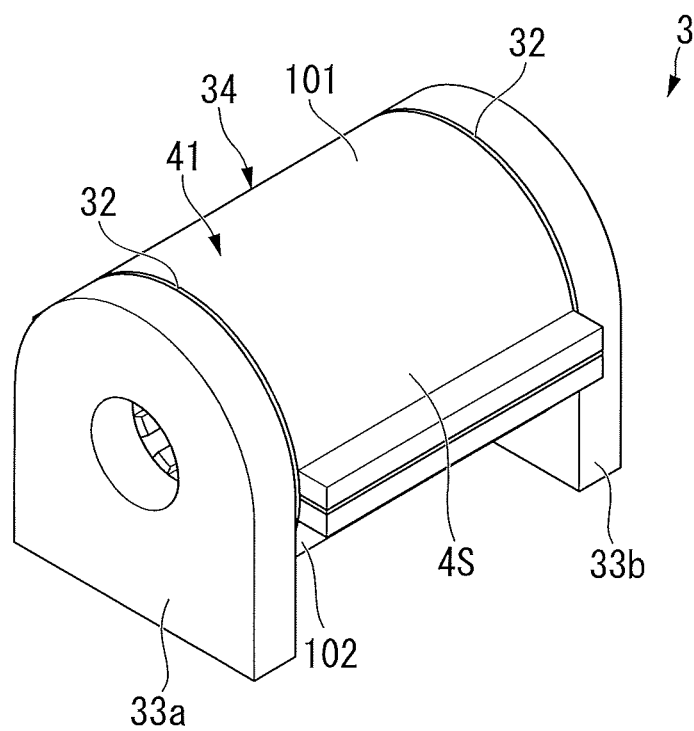
FIG. 15A is a perspective view showing a stator of the fourth embodiment.
Figure 15B:
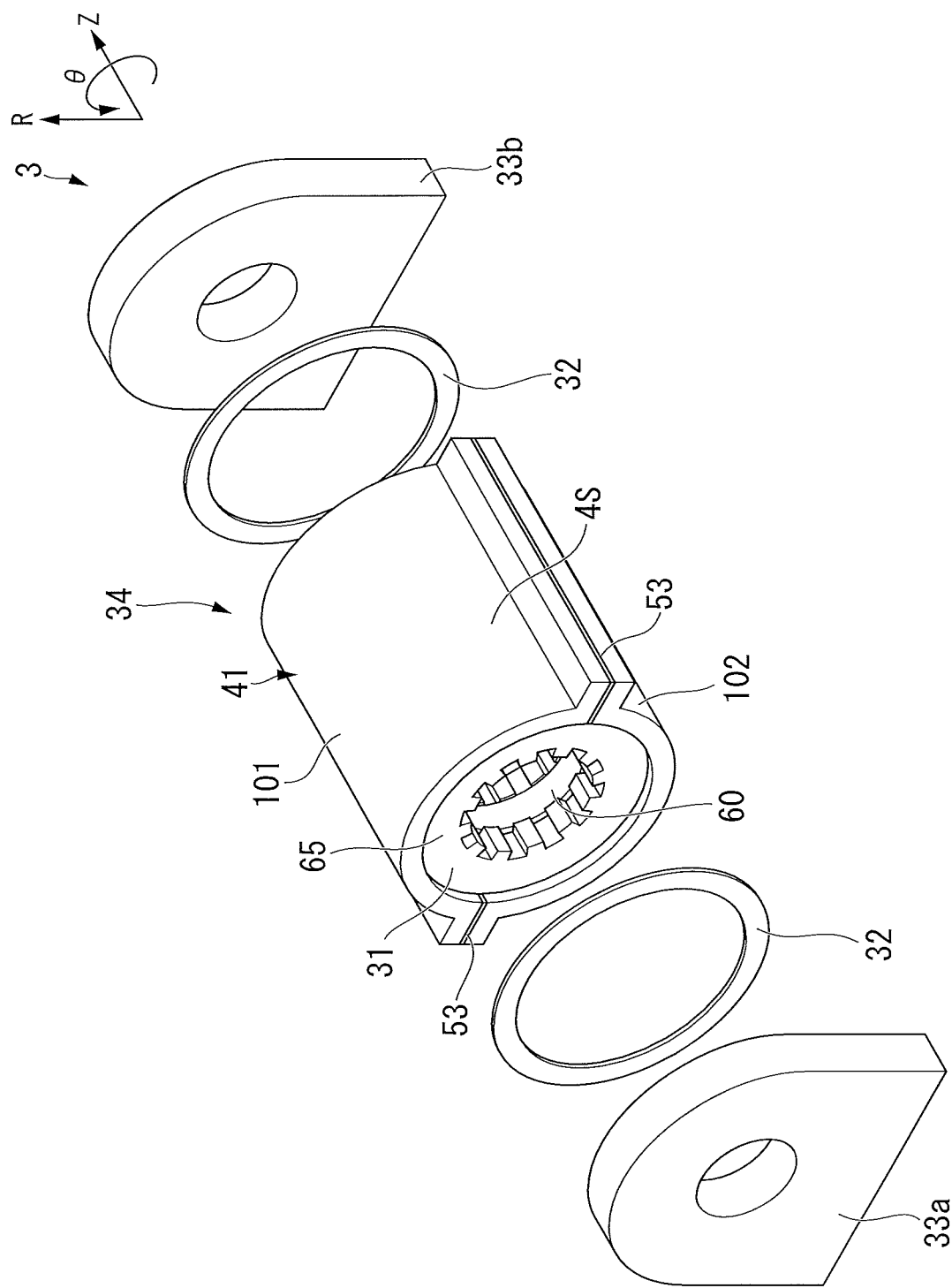
FIG. 15B is a partially exploded perspective view showing the stator of the fourth embodiment.
Figure 16A:
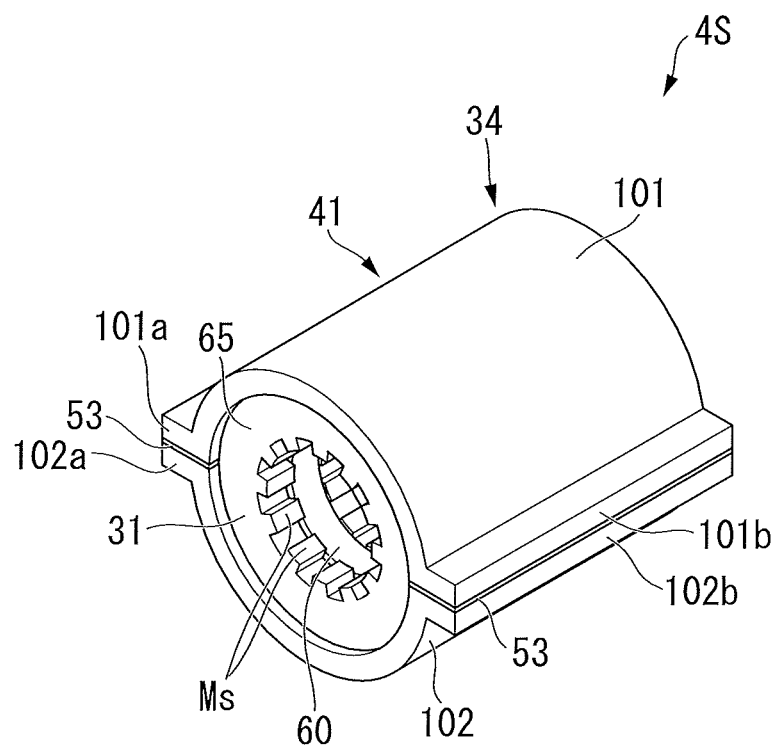
FIG. 16A is a perspective view showing stator parts included in a basic unit set of the fourth embodiment.
Figure 16B:
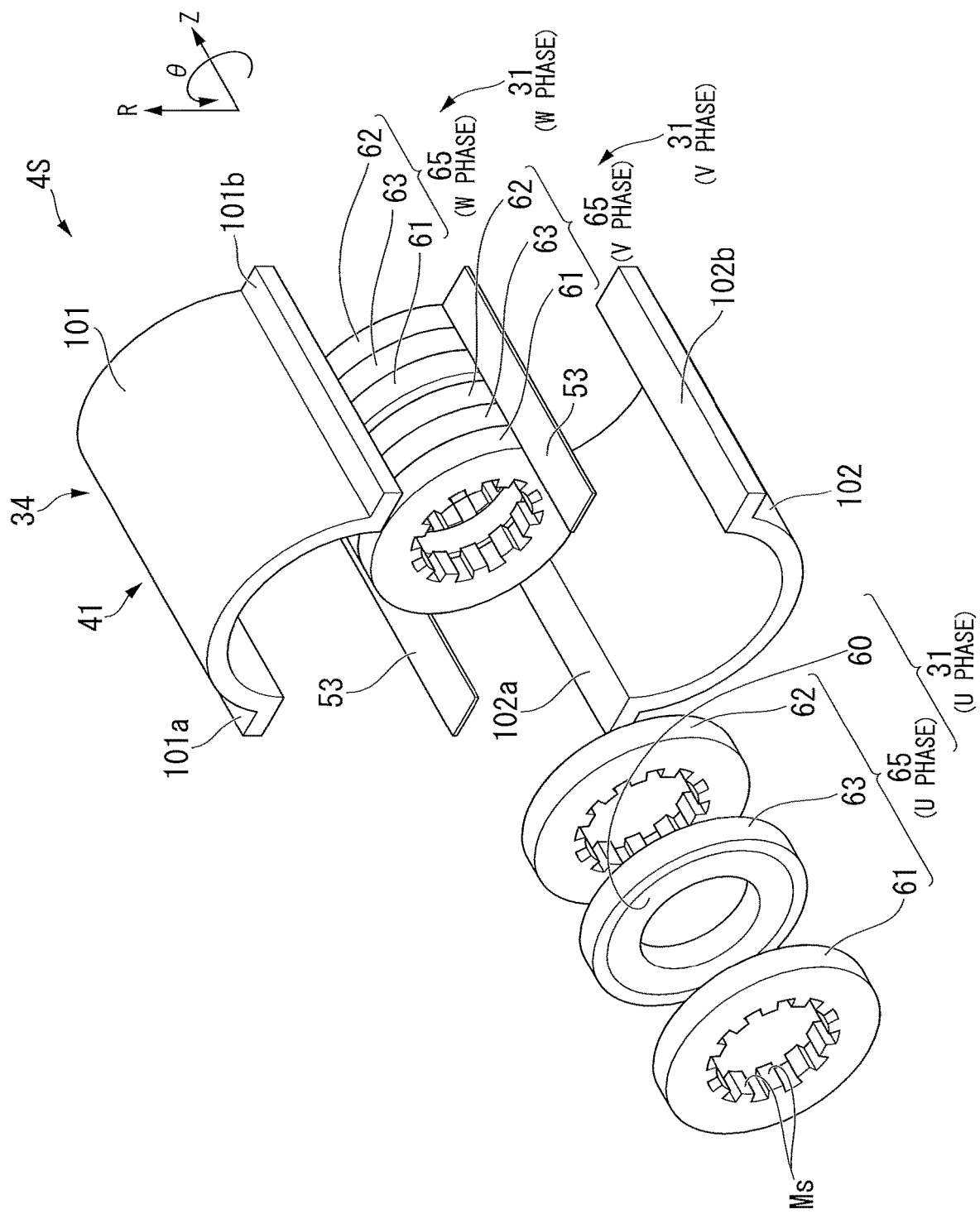
FIG. 16B is a partially exploded perspective view showing the stator parts included in the basic unit set of the fourth embodiment.

FIG. 15A is a perspective view showing the stator 3 of the embodiment. FIG. 15B is a partially exploded perspective view showing the stator 3 shown in FIG. 15A. FIG. 16A is a perspective view showing stator parts included in the basic unit set 4S of the embodiment. FIG. 16B is a partially exploded perspective view showing the stator parts included in the basic unit set 4S shown in FIG. 16A.

For example, as shown in FIG. 15B, in the embodiment, for example, the stator 3 includes the plurality of (for example, three) armatures 31 (see FIG. 16B) included in one basic unit set, the plurality of spacers 32, the pair of bearing holders 33a and 33b, and the support structure 34 configured to integrally support the plurality of armatures 31.

The support structure 34 includes, for example, one core supporter 41. The core supporter 41 includes the first casing member 101, the second casing member 102, the insulating sheet 53 and the plurality of fixing members 54 (see FIG. 17). The core supporter 41 of the embodiment includes, for example, the stator core 65 of the three armatures 31 of the U phase, the V phase and the W phase, which are integrally installed therein.

The core supporter 41 is formed in a substantially annular shape along the external form of the stator core 65 (for example, around the external form). The core supporter 41 is divided into at least the first casing member 101 and the second casing member 102 in the rotation direction θ. The first casing member 101 and the second casing member 102 have substantially diametrically-half shapes. The first casing member 101 is an example of "the first member." The second casing member 102 is an example of "the second member." In the embodiment, the first casing member 101 and the second casing member 102 are formed in a shape in which the core supporter 41 is divided into substantially two parts. That is, each of the first casing member 101 and the second casing member 102 is formed in a semi-circular arc shape. In other words, the first casing member 101 and the second casing member 102 are divided and disposed separately on both sides of the stator core 65. The first casing member 101 and the second casing member 102 are formed of, for example, a non-magnetic material.

As shown in FIG. 16B, both end portions of the first casing member 101 in a casing widthwise direction perpendicular to the axial direction Z include fixing end portions 101a and 101b connected to the second casing member 102. Similarly, both end portions of the second casing member 102 in the casing widthwise direction include fixing end portions 102a and 102b connected to the first casing member 101. The fixing end portion 102a of the second casing member 102 faces the fixing end portion 101a of the first casing member 101. Similarly, the fixing end portion 102b of the second casing member 102 faces the fixing end portion 101b of the first casing member 101.

The insulating sheet 53 is sandwiched between the first casing member 101 and the second casing member 102 (i.e., provided in the boundary between the first casing member 101 and the second casing member 102) to electrically insulate the first casing member 101 and the second casing member 102. In the embodiment, the insulating sheet 53 is installed between the fixing end portion 101a of the first casing member 101 and the fixing end portion 102a of the second casing member 102 and between the fixing end portion 101b of the first casing member 101 and the fixing end portion 102b of the second casing member 102.

When seen from another viewpoint, the core supporter 41 of the embodiment includes the first connecting section 75A and the second connecting section 75B. The first connecting section 75A is a combination of the fixing end portion 101a of the first casing member 101 and the fixing end portion 102a of the second casing member 102. The second connecting section 75B is a combination of the fixing end portion 101b of the first casing member 101 and the fixing end portion 102b of the second casing member 102. In each of the first connecting section 75A and the second connecting section 75B, for example, the first casing member 101 and the second casing member 102 are connected by the fixing members 54 (to be described below). In the embodiment, the insulating sheet 53 is provided in on each of the first connecting section 75A and the second connecting section 75B, and electrically insulates the first casing member 101 and the second casing member 102 in each of the first connecting section 75A and the second connecting section 75B.

In addition, the insulating sheet 53 forms an example of the slit-shaped insulating section formed in the core supporter 41 in the axial direction Z when the core supporter 41 including the first casing member 101 and the second casing member 102 is viewed integrally. The insulating sheet 53 of the embodiment is an example of "the first insulating section." The insulating sheet 53 passes through the core supporter 41 in the axial direction Z.

Figure 17:
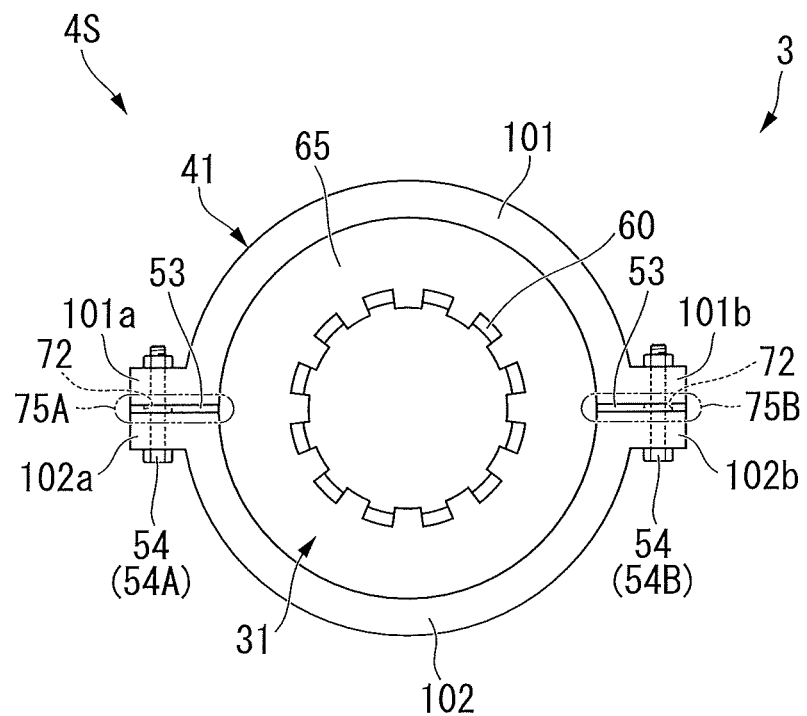
FIG. 17 is a front view showing the stator parts included in the basic unit set of the fourth embodiment.

FIG. 17 is a front view showing the stator parts included in the basic unit set 4S. As shown in FIG. 17, each of the plurality of fixing members 54 is attached to, for example, the first casing member 101 from the second casing member 102 and fixes the first casing member 101 to the second casing member 102. The fixing member 54 is a fastening member such as a bolt. The fixing members 54 pass through the insulating sheet 53 in a direction in which the first casing member 101 and the second casing member 102 overlap and extend over the first casing member 101 and the second casing member 102.

In the embodiment, the plurality of fixing members 54 include at least one first fixing member 54A and at least one second fixing member 54B. The first fixing member 54A extends over the fixing end portion 101a of the first casing member 101 and the fixing end portion 102a of the second casing member 102 and fixes the first casing member 101 and the second casing member 102. Meanwhile, the second fixing member 54B extends over the fixing end portion 101b of the first casing member 101 and the fixing end portion 102b of the second casing member 102 and fixes the first casing member 101 and the second casing member 102. The first fixing member 54A is an example of "the first fixing portion." The second fixing member 54B is an example of "the second fixing portion." Further, "the first fixing portion" and "the second fixing portion" are not limited to a fastening member such as a bolt and may be a fixing portion (an adhering section) formed of an adhesive agent or the like.

Next, an action of the rotating electrical machine 1 of the embodiment will be described.

Figure 18:
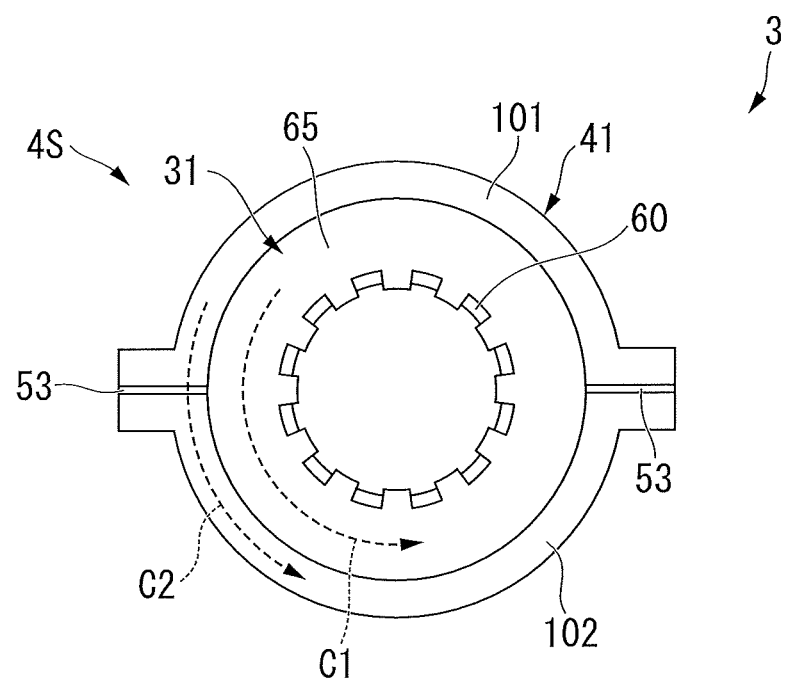
FIG. 18 is a view showing an action of the rotating electrical machine of the fourth embodiment.

FIG. 18 is a view showing an action of the rotating electrical machine 1 of the embodiment.

In the embodiment, the stator core 65 is formed by the pressed powder core. For this reason, generation of the circulating current Cl flowing in the stator core 65 is suppressed first. Further, in the embodiment, the insulating sheet 53 is provided in the boundary between the first casing member 101 and the second casing member 102. Accordingly, an electric flow path that connects the first casing member 101 and the second casing member 102 is blocked. Accordingly, generation of the circulating current C2 flowing through the first casing member 101 and the second casing member 102 as a path is suppressed. As a result, generation of the circulating current around the rotary center axis C according to rotation driving of the rotating electrical machine 1 can be suppressed in both of the stator core 65 and the core supporter 41.

According to the rotating electrical machine 1 having the above-mentioned configuration, like the first embodiment, improvement in performance of the rotating electrical machine 1 can be achieved.

Next, fifth to ninth embodiments will be described. The fifth to ninth embodiments are use examples of the rotating electrical machine 1 described as the first to fourth embodiments and variants thereof.

Fifth Embodiment

Figure 19:
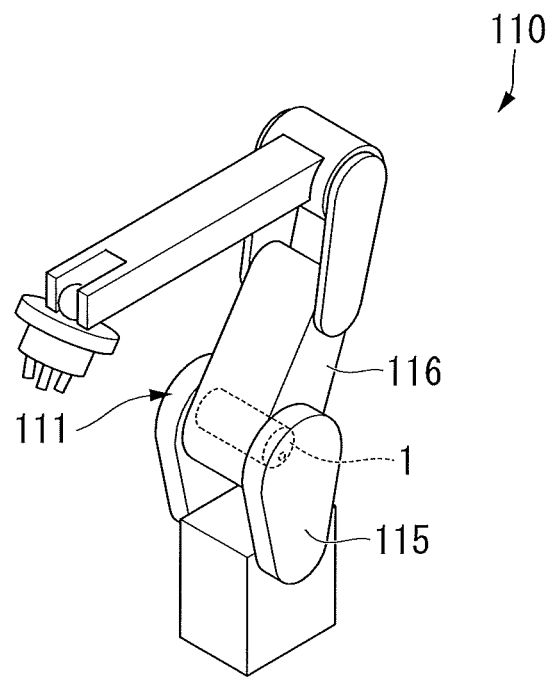
FIG. 19 is a perspective view schematically showing a robot device of a fifth embodiment.

FIG. 19 is a perspective view schematically showing a robot device 110 of a fifth embodiment.

As shown in FIG. 19, the robot device 110 includes a joint 111 and a rotating electrical machine 1. The joint 111 includes a first member 115, a second member 116, and a hinge (not shown) configured to pivotably connect the first member 115 and the second member 116. The rotating electrical machine 1 directly drives the joint 111 or indirectly drives the joint 111 via a gear or the like. That is, the rotating electrical machine 1 relatively moves the second member 116 with respect to the first member 115. Further, the rotating electrical machine 1 is not limited to the joint 111 and may also be used in other portions of the robot device 110.

According to the above-mentioned configuration, since the robot device 110 includes the above-mentioned rotating electrical machine 1, improvement in performance can be achieved.

Sixth Embodiment

Figure 20:
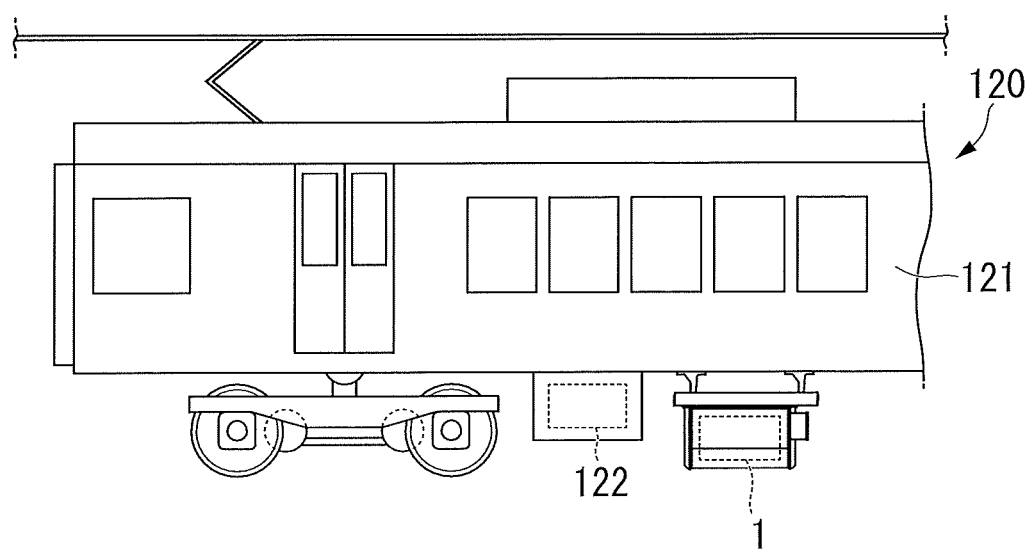
FIG. 20 is a side view schematically showing a railroad vehicle of a sixth embodiment.

FIG. 20 is a side view schematically showing a railroad vehicle 120 of a sixth embodiment.

As shown in FIG. 20, the railroad vehicle 120 is, for example, an electric vehicle. The railroad vehicle 120 includes a vehicle body 121, a battery 122 and a rotating electrical machine 1. The battery 122 supplies power to the rotating electrical machine 1. The rotating electrical machine 1 outputs a traveling driving force to move the railroad vehicle 120.

According to the above-mentioned configuration, since the railroad vehicle 120 includes the above-mentioned rotating electrical machine 1, improvement in performance can be achieved.

Seventh Embodiment

Figure 21:
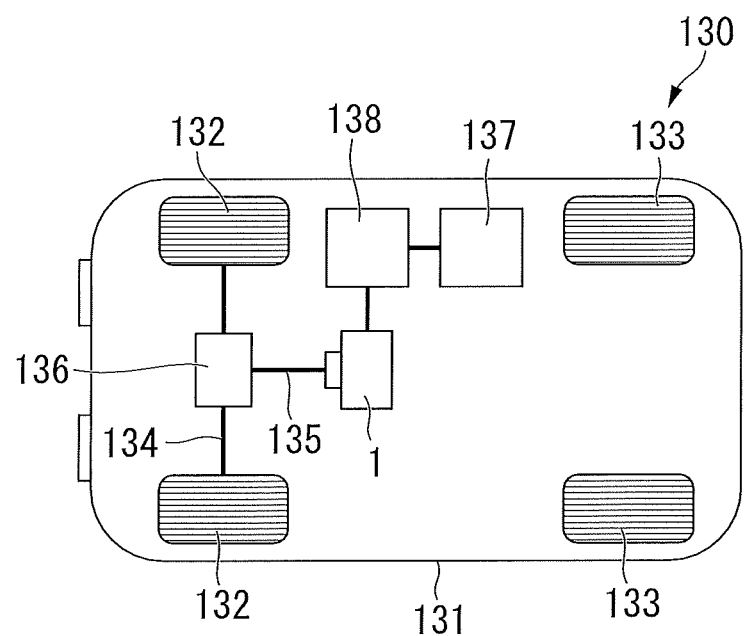
FIG. 21 is a view schematically showing an electric vehicle of a seventh embodiment.

FIG. 21 is a view schematically showing an electric vehicle 130 of a seventh embodiment.

As shown in FIG. 21, the electric vehicle 130 is, for example, an electric automobile. The electric vehicle 130 includes a vehicle body 131, two front wheels 132, two rear wheels 133, drive shafts 134 and 135, a differential gear 136, a battery 137, a rotating electrical machine 1 and a control device 138. The front wheels 132 are connected to the rotating electrical machine 1 via the drive shafts 134 and 135 and the differential gear 136. The battery 137 supplies power to the rotating electrical machine 1. The rotating electrical machine 1 outputs a traveling driving force to move the electric vehicle 130.

According to the above-mentioned configuration, since the electric vehicle 130 includes the above-mentioned rotating electrical machine 1, improvement in performance can be achieved.

Eighth Embodiment

Figure 22:
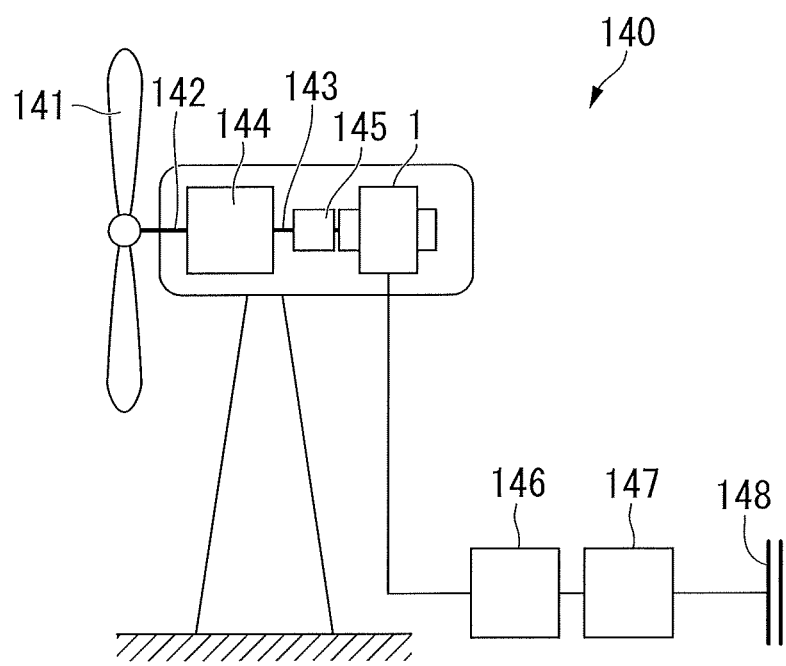
FIG. 22 is a view schematically showing a wind energy generator of an eighth embodiment.

FIG. 22 is a view for schematically showing a wind energy generator 140 of an eighth embodiment.

As shown in FIG. 22, the wind energy generator 140 includes a blade 141, rotary shafts 142 and 143, a speed-increasing apparatus 144, a shaft joint 145, a rotating electrical machine 1, a transformer 146, a system protection device 147 and a power system 148. When the blade 141 is rotated by wind power, a torque is transmitted to the speed-increasing apparatus 144 via the rotary shaft 142. An output torque of the speed-increasing apparatus 144 is input to the rotating electrical machine 1 via the rotary shaft 143 and the shaft joint 145. The rotating electrical machine 1 of the embodiment is a generator and performs a power generating operation using a torque input from the shaft joint 145. Power generated by the rotating electrical machine 1 is output to the power system 148 via the transformer 146 and the system protection device 147. Further, the rotating electrical machine 1 is not limited to the wind energy generator 140 and may be widely used in a hydraulic generating apparatus or various other generators.

According to the above-mentioned configuration, since the wind energy generator 140 includes the above-mentioned rotating electrical machine 1, improvement in performance can be achieved.

Ninth Embodiment

Figure 23:
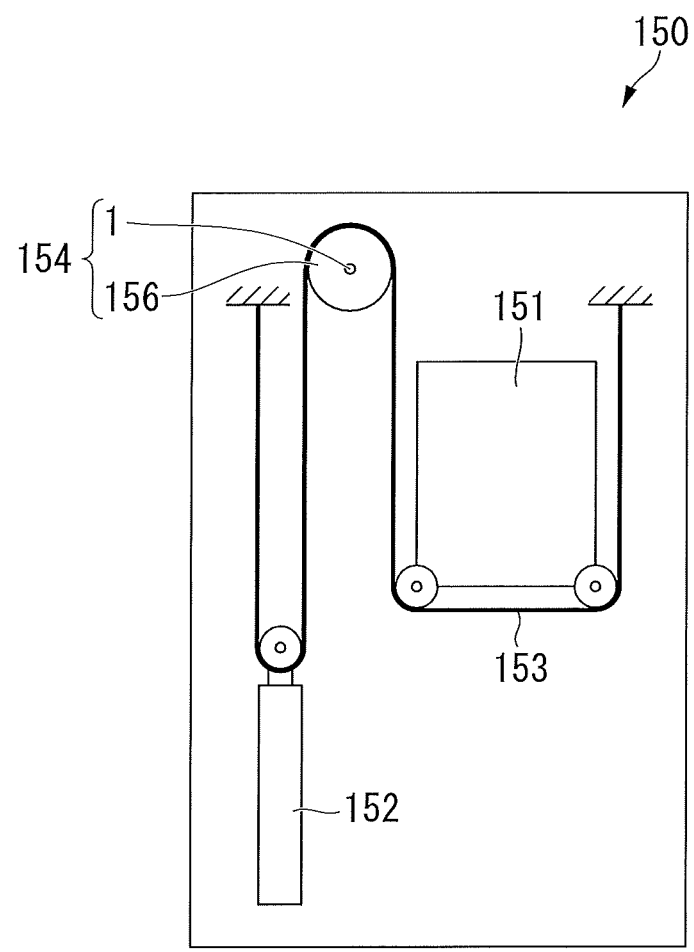
FIG. 23 is a view schematically showing an elevator of a ninth embodiment.

FIG. 23 is a view for schematically showing an elevator 150 of a ninth embodiment.

As shown in FIG. 23, the elevator 150 includes an elevator cage 151, a counter weight 152, a rope 153 and a hoisting machine 154.

The elevator cage 151 is provided in an elevation path and is elevatable along a guide rail (not shown). One end portion of the rope 153 is connected to the elevator cage 151. The counter weight 152 is provided in the elevation path and is elevatable along another guide rail (not shown). The other end portion of the rope 153 is connected to the counter weight 152.

The hoisting machine 154 includes a sheave 156 and a rotating electrical machine 1. The rope 153 is wound on the sheave 156. The rotating electrical machine 1 drives the sheave 156. The rotating electrical machine 1 elevates the elevator cage 151 and the counter weight 152 by rotating the sheave 156.

According to the above-mentioned configuration, since the hoisting machine 154 and the elevator 150 include the above-mentioned rotating electrical machine 1, improvement in performance can be achieved.

Hereinabove, the rotating electrical machine 1, the robot device 110, the railroad vehicle 120, the electric vehicle 130, the wind energy generator 140, the hoisting machine 154 and the elevator 150 according to the first to ninth embodiment have been described. According to the rotating electrical machine 1, since the circulating current can be suppressed, in particular, reduction in vibration/noise can be achieved while realizing rotation performance such as a high output, a high torque, or the like. For this reason, use as a high torque and high output driving source and use as a large generator in fields in which large torque or output density is required, for example, a wide range of fields such as machine tools, ships, automobiles, robots, or the like, can also be expected.

Further, the configuration of the embodiment is not limited to the above-mentioned embodiments and the variants. For example, the stator core 65 and the rotor core 21 are not limited to the core formed by the pressed powder core and may be formed by an electromagnetic steel plate (a lamination steel plate) wound a plurality of times in a vortex shape in the rotation direction θ. Also in the above-mentioned case, as the insulating section 71 or the insulating sheet 53 is installed, the circulating current flowing through the core supporters 41 can be suppressed.

For example, while the configuration of the stator core 65 in which the third stator core 63 is sandwiched between the first stator core 61 and the second stator core 62, and the configuration of the stator core 65 having the twelve stator magnetic poles Ms, and the rotor core 21 having the twenty four rotor magnetic poles Mr are provided in the above-mentioned embodiments, these are merely specific examples of the configurations and there is no limitation thereto. For example, the configuration of the core and the number of the magnetic poles may be required to be designed. For example, the third stator core 63 may be a core fitted onto the first stator core 61 and the second stator core 62 from the outside. These may be appropriately changed and used in actual device design. Determination of the configuration of the stator core 65 or the number of the magnetic poles is appropriately determined on the basis of various specification values such as a torque or the rotational speed obtained by a device which is a design target and restrictions in terms of mechanical strength, manufacturing assembly, or the like, required for the stator core 65.

The rotating electrical machine 1 according to the above-mentioned embodiment is not limited to an example serving as a radial gap motor in which a normal lines to a surface opposite to the rotor 11 and the armatures 31 are in the radial direction R. The rotating electrical machine 1 of the embodiment may be an axial gap motor in which normal lines to a surface opposite to the rotor 11 and the armatures 31 is the axial direction Z. The axial gap motor has a configuration in which the winding 60 is sandwiched by the stator core from the radial direction R rather than sandwiching the winding 60 by the stator core from the axial direction Z. Further, the rotating electrical machine 1 of the embodiment is not limited to an example in which the rotor 11 is an inner rotor disposed inside the armatures 31. The rotating electrical machine 1 of the embodiment may be an outer rotor in which the rotor 11 is disposed outside the armatures 31.

Figure 24:
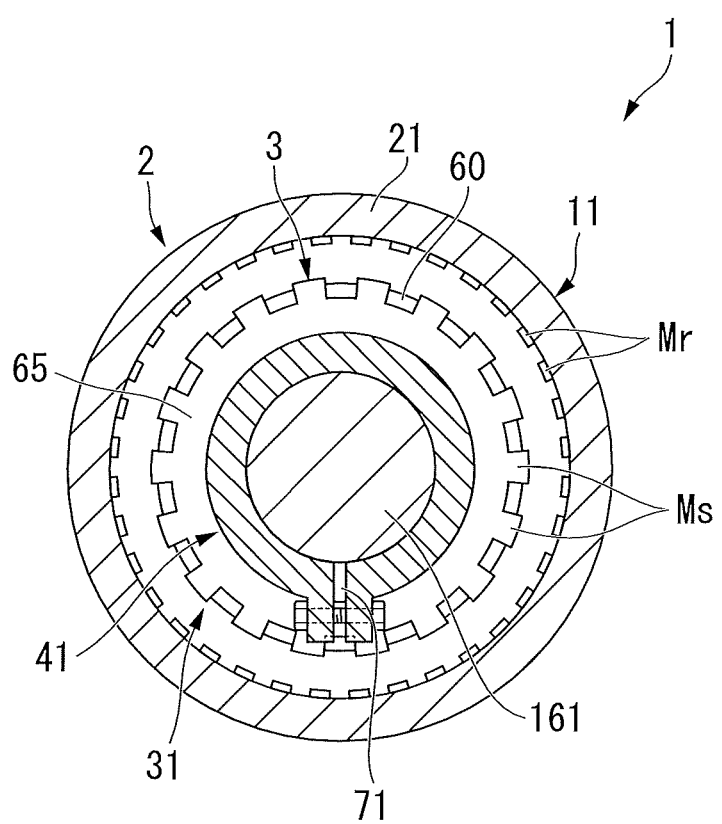
FIG. 24 is a cross-sectional view showing a rotating electrical machine of a variant of the embodiment.

For example, FIG. 24 is a cross-sectional view showing a rotating electrical machine 1 of a variant of the embodiment.

As shown in FIG. 24, the rotating electrical machine 1 of the variant is an outer rotor type rotating electrical machine. The rotating electrical machine 1 includes a fixed shaft 161, a stator core 65 formed in an annular shape, a winding 60, a rotor core 21 installed on outer circumferential side sides of the stator core 65 and the winding 60, and a core supporter 41. The core supporter 41 is formed in an annular shape along an inner circumferential surface of the stator core 65 and installed in the stator core 65. The core supporter 41 is installed on an inner circumferential side of the stator core 65 and supports the stator core 65 from the inner circumferential side. The slit-shaped insulating section 71 in the axial direction Z is formed in the core supporter 41. In other words, the core supporter 41 in which the insulating section 71 or the insulating sheet 53 is provided is not limited to a member configured to support the stator core 65 from the outer circumferential side and may be a member configured to support the stator core 65 from the inner circumferential side.

In addition, the core supporter 41 is not limited to the member configured to support the stator core 65. For example, the core supporter 41 may be a core supporter configured to support the rotor core 21.

According to at least one of the above-mentioned embodiments, since the slit-shaped insulating section in the axial direction of the shaft is formed in the core supporter, improvement in performance of the rotating electrical machine can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A rotating electrical machine comprising:
a shaft;
an annular winding extending in a rotation direction of the shaft;
a stator core comprising a plurality of stator magnetic poles, the plurality of stator magnetic poles being arranged along the winding;
a rotor core comprising a plurality of rotor magnetic poles, the plurality of rotor magnetic poles being configured to face the plurality of stator magnetic poles; and
a core supporter configured to support the stator core,
the core supporter comprising: a substantially annular casing and a base, the casing extending along an external form of the stator core, and the base including a surface that is substantially parallel to an axial direction of the shaft, the surface of the base facing the casing,
the core supporter including a first insulating section and a second insulating section,
the first insulating section extending in a portion of the casing in the rotation direction of the shaft, the first insulating section extending in the axial direction of the shaft, and the first insulating section having a slit-shape,
the second insulating section being at a boundary between the casing and the base, and the second insulating section electrically insulating the casing and the base, and
in the casing, the first insulating section facing the second insulating section.
2. The rotating electrical machine according to claim 1, wherein the core supporter is non-magnetic.
3. The rotating electrical machine according to claim 1, wherein
the second insulating section is an insulating sheet between the casing and the base.
4. The rotating electrical machine according to claim 1, wherein
the second insulating section is an insulating layer on a surface of at least one of the casing and the base.
5. The rotating electrical machine according to claim 1, further comprising
a plurality of fixing portions fixing the casing to the base, wherein
the casing comprises a first portion and a second portion on both sides of the first insulating section in the rotation direction, and
the plurality of fixing portions comprise a first fixing portion and a second fixing portion, the first fixing portion fixes the first portion of the casing to the base, and the second fixing portion fixes the second portion of the casing to the base.

6. The rotating electrical machine according to claim 5, wherein
the first portion of the casing has a hole,
the first fixing portion is a first fixing member, and the first fixing member includes a portion in the hole of the first portion of the casing,
the second portion of the casing has a hole,
the second fixing portion is a second fixing member, the second fixing member includes a portion in the hole of the second portion of the casing, and
at least a part of the first insulating section is between the first fixing member and the second fixing member.

7. The rotating electrical machine according to claim 1, wherein
the core supporter comprises a first member and a second member which have substantially diametrically-half shapes, and
the first insulating section is provided in a boundary between the first member and the second member, and the first insulating section electrically insulates the first member and the second member.

8. The rotating electrical machine according to claim 7, wherein
the first insulating section is an insulating sheet between the first member and the second member.

9. The rotating electrical machine according to claim 7, wherein
the first insulating section is an insulating layer on a surface of at least one of the first member and the second member.

10. The rotating electrical machine according to claim 7, further comprising
a fixing portion passing through the first insulating section in a direction in which the first member and the second member overlap each other, and the fixing portion fixes the first member and the second member.

11. A rotating electrical machine comprising:
a shaft;
an annular winding in a rotation direction of the shaft;
a stator core comprising a plurality of stator magnetic poles, the plurality of stator magnetic poles being arranged along the winding;
a rotor core comprising a plurality of rotor magnetic poles, the plurality of rotor magnetic poles being configured to face the plurality of stator magnetic poles; and
a core supporter configured to support the stator core, the core supporter comprising: a substantially annular casing and a base, the casing extending along an external form of the stator core, and the base including a surface that is substantially parallel to an axial direction of the shaft, the surface of the base facing the casing; and
a plurality of fixing portions fixing the casing to the base, the core supporter including a first insulating section and a second insulating section,
the first insulating section extending in a portion of the casing in the rotation direction of the shaft, the first insulating section extending in the axial direction of the shaft, and the first insulating section having a slit-shape,
the second insulating section being at a boundary between the casing and the base, and the second insulating section electrically insulating the casing and the base, and
the casing comprising a first portion and a second portion on both sides of the first insulating section in the rotation direction of the shaft, and
the plurality of fixing portions comprise a first fixing portion and a second fixing portion, the first fixing portion fixing the first portion of the casing to the base, and the second fixing portion fixing the second portion of the casing to the base.

12. The rotating electrical machine according to claim 11, wherein
the first portion of the casing has a hole,
the first fixing portion is a first fixing member, and the first fixing member includes a portion in the hole of the first portion of the casing,
the second portion of the casing has a hole,
the second fixing portion is a second fixing member, the second fixing member includes a portion in the hole of the second portion of the casing, and
at least a part of the first insulating section is between the first fixing member and the second fixing member.

13. A robot device comprising:
a first member;
a second member;
a joint connecting the first member and the second member; and
a rotating electrical machine configured to relatively move the second member with respect to the first member,
wherein
the rotating electrical machine comprises:
a shaft;
an annular winding extending in a rotation direction of the shaft;
a stator core comprising a plurality of stator magnetic poles, the plurality of stator magnetic poles being arranged along the winding;
a rotor core comprising a plurality of rotor magnetic poles, the plurality of rotor magnetic poles being configured to face the plurality of stator magnetic poles; and
a core supporter configured to support the stator core, the core supporter comprising: a substantially annular casing and a base, the casing extending along an external form of the stator core, and the base including a surface that is substantially parallel to an axial direction of the shaft, the surface of the base facing the casing,
the core supporter including a first insulating section and a second insulating section,
the first insulating section extending in a portion of the casing in the rotation direction of the shaft, the first insulating section extending in the axial direction of the shaft, and the first insulating section having a slit-shape,
the second insulating section being at a boundary between the casing and the base, and the second insulating section electrically insulating the casing and the base, and
in the casing, the first insulating section facing the second insulating section.

* * * * *